(12) United States Patent
Kamasaka et al.

(10) Patent No.: US 8,103,717 B2
(45) Date of Patent: Jan. 24, 2012

(54) TERMINAL APPARATUS, SERVER APPARATUS, AND INSTRUCTION APPARATUS

(75) Inventors: Hitoshi Kamasaka, Tokyo (JP); Shinji Kitagami, Tokyo (JP); Atsushi Murata, Tokyo (JP); Takao Shindou, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 685 days.

(21) Appl. No.: 11/991,809

(22) PCT Filed: Mar. 16, 2006

(86) PCT No.: PCT/JP2006/305250
§ 371 (c)(1),
(2), (4) Date: Mar. 11, 2008

(87) PCT Pub. No.: WO2007/039942
PCT Pub. Date: Apr. 12, 2007

(65) Prior Publication Data
US 2010/0223319 A1  Sep. 2, 2010

(30) Foreign Application Priority Data
Oct. 6, 2005 (JP) .................................. 2005-293401

(51) Int. Cl.
*G06F 15/16* (2006.01)
(52) U.S. Cl. ........................................ 709/203; 709/237
(58) Field of Classification Search .................. 709/203, 709/237
See application file for complete search history.

(56) References Cited

U.S. PATENT DOCUMENTS

| 7,627,651 | B2 * | 12/2009 | Joy et al. ........................ 709/219 |
| 2002/0194289 | A1 * | 12/2002 | Engel et al. .................... 709/208 |
| 2003/0070094 | A1 * | 4/2003 | Gomes et al. ................. 709/223 |
| 2003/0135613 | A1 | 7/2003 | Yoshida et al. |
| 2003/0221011 | A1 | 11/2003 | Shitano |
| 2004/0098483 | A1 * | 5/2004 | Engel ............................ 709/227 |
| 2004/0148328 | A1 * | 7/2004 | Matsushima ................. 709/200 |
| 2004/0151132 | A1 | 8/2004 | Terashima et al. |
| 2004/0153501 | A1 * | 8/2004 | Yamashita et al. ............ 709/203 |
| 2005/0015584 | A1 | 1/2005 | Takechi et al. |
| 2006/0195568 | A1 * | 8/2006 | Staurnes et al. .............. 709/224 |

FOREIGN PATENT DOCUMENTS

| JP | 2002-223483 A | 8/2002 |
| JP | 2003-108449 A | 4/2003 |
| JP | 2003-256303 A | 9/2003 |
| JP | 2004-120547 A | 4/2004 |
| JP | 2004-227121 A | 8/2004 |
| JP | 2004-246822 A | 9/2004 |

* cited by examiner

*Primary Examiner* — Patrice Winder
(74) *Attorney, Agent, or Firm* — Birch, Stewart, Kolasch & Birch, LLP

(57) ABSTRACT

An access from a server apparatus to a terminal apparatus is made safely and reliably possible without changing the setting of a firewall, etc. The terminal apparatus 100 sends instruction inquiries 711, 712, to inquire of the server apparatus 200 about existence/absence of a command (an execution instruction) to be executed by the terminal apparatus 100, in a form of an HTTP request (S12). The server apparatus 200 sends reply data 721, 722 (an inquiry response) including the command, in the form of an HTTP response to the HTTP request, to the terminal apparatus 100 (S26, S29) when the command to be executed by the terminal apparatus 100 exists. The terminal apparatus 100 executes the command when the reply data 721, 722 includes the command.

14 Claims, 13 Drawing Sheets

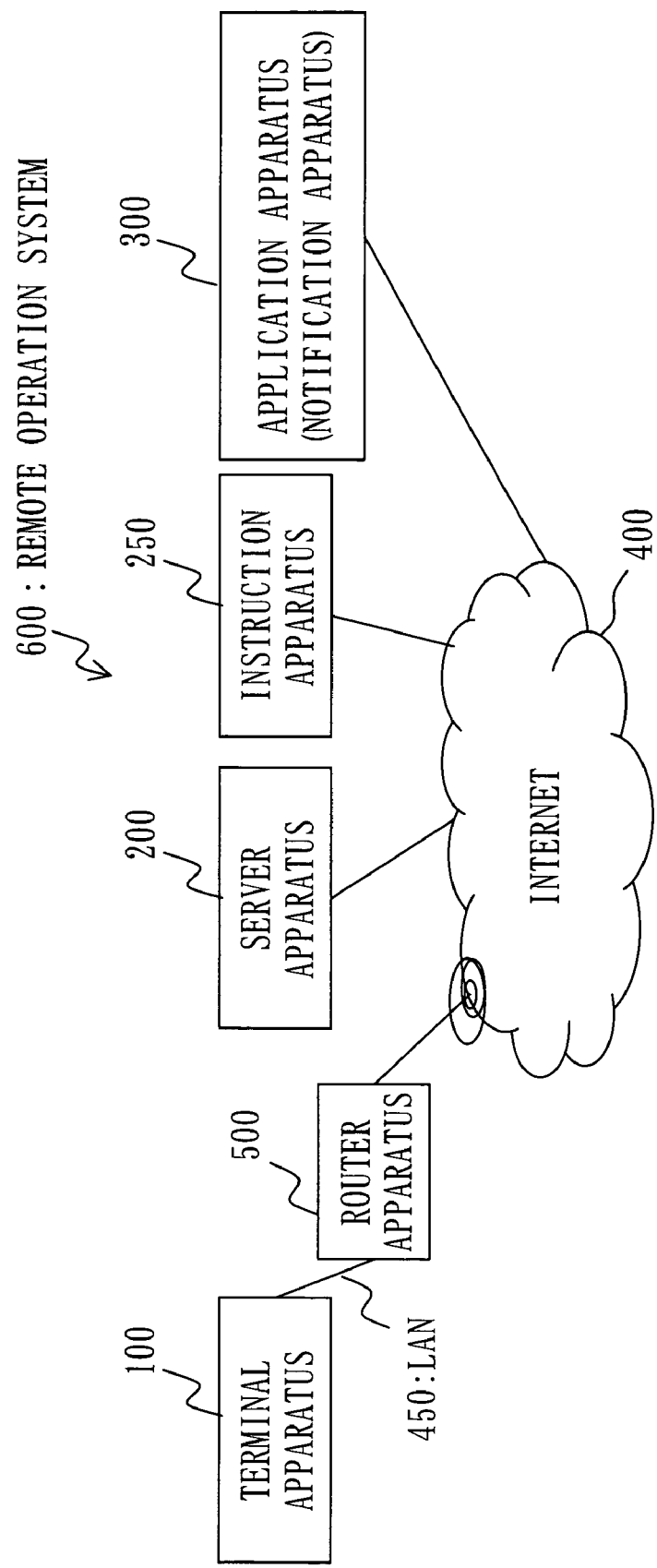

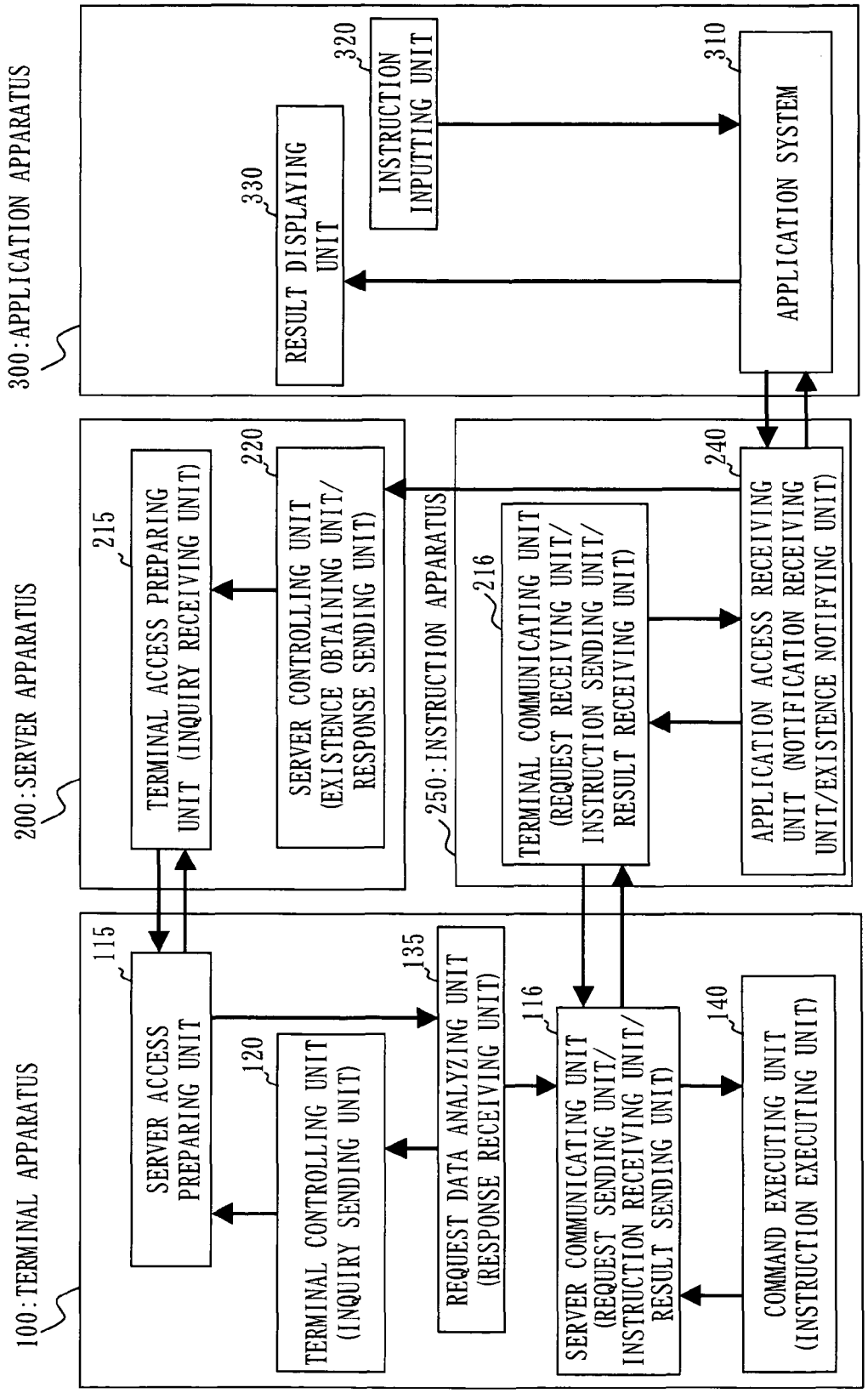

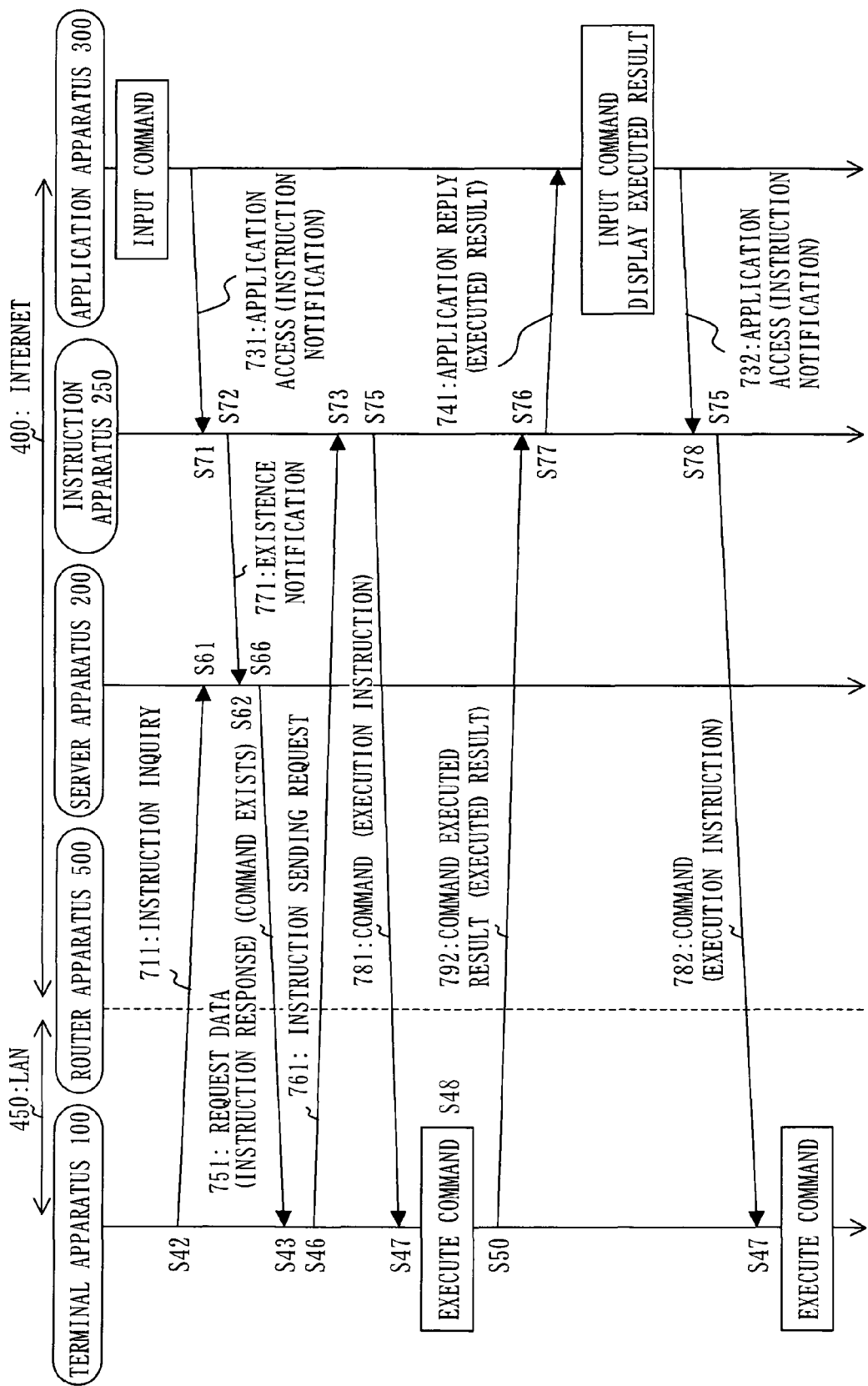

TERMINAL APPARATUS, SERVER APPARATUS, AND INSTRUCTION APPARATUS

TECHNICAL FIELD

The present invention relates to a technique to access an apparatus (a terminal apparatus) connected to a LAN (Local Area Network), which is connected to the Internet via a gateway apparatus, from an apparatus (a server apparatus) connected to the Internet.

BACKGROUND ART

Various limitations exist for accessing an apparatus (a terminal apparatus) connected to a LAN, which is connected to the Internet via a gateway apparatus, from an apparatus (a server apparatus) connected to the Internet.

For example, here is a technique, in which when, a terminal apparatus does not have a global IP (Internet Protocol) address but only has a local IP address, a gateway apparatus (a router) converts the IP address or a port number using a NAT (Network Address Translation) function or a NAPT (Network Address Port Translation) function.

When the IP address or the port number of the terminal apparatus is converted using the NAT function or the NAPT function, a server apparatus knows the IP address or the port number of the terminal apparatus by a request from the terminal apparatus. Accordingly, it is difficult to actively access the terminal apparatus from the server apparatus side.

To solve the above problem, there are techniques, for example, Patent Document 1.

Further, from the viewpoint of security, there is a technique that a gateway apparatus limits accesses from a server apparatus to a terminal apparatus (so-called firewall).

Among various firewall techniques, a method is popularly used, in which an access from the terminal apparatus to the server apparatus and its response from the server apparatus are allowed, and other accesses from the server apparatus to the terminal apparatus are prohibited.
Patent Document 1: JP2004-120547

DISCLOSURE OF THE INVENTION

Problems to be Solved by the Invention

The technique disclosed in Patent Document 1 uses UDP (User Datagram Protocol) to access the terminal apparatus from the server apparatus.

However, since the UDP does not include procedure such as starting communication, it is difficult to detect which of the terminal apparatus and the server apparatus has started the communication.

Therefore, in the firewall technique, the communication using the UDP is sometimes prohibited without exception, and there is a problem that the setting of firewall should be changed in order to use the technique of Patent Document 1. Further, there is another problem that the security may be decreased as a result of changing the setting.

The present invention is provided to solve, for example, the above problem, and aims to enable the server apparatus to access the terminal apparatus without complicated procedure such as changing the setting of firewall, namely, without decreasing the security.

Means to Solve the Problems

According to the present invention, a terminal apparatus having a communication device communicating with a server apparatus via a network and an execution device executing an execution instruction, the terminal apparatus includes:

an inquiry sending unit for sending an instruction inquiry to inquire about existence/absence of the execution instruction, in a form of an HTTP (Hypertext Transfer Protocol) request, to the server apparatus using the communication device;

a response receiving unit for receiving a response to the instruction inquiry sent by the inquiry sending unit as an instruction response, in a form of an HTTP response to the HTTP request which is the instruction inquiry, from the server apparatus using the communication device; and an instruction executing unit for executing the execution instruction using the execution device when the instruction response received by the response receiving unit has contents showing that the execution instruction exists.

The terminal apparatus further includes:

a result sending unit for sending a result of the execution instruction executed by the instruction executing unit as an executed result, in the form of the HTTP request, to the server apparatus using the communication device, and the response receiving unit further receives existence/absence of another execution instruction to be executed by the execution device as the instruction response, in the form of the HTTP response to the HTTP request which is the executed result sent by the result sending unit, from the server apparatus using the communication device.

The instruction executing unit, when the execution instruction is included in the instruction response received by the response receiving unit, executes the execution instruction included in the instruction response using the execution device.

The communication device further communicates with an instruction apparatus via the network, the terminal apparatus further includes:

a request sending unit for sending an instruction sending request to request transmission of the execution instruction, in the form of the HTTP request, to the instruction apparatus using the communication device when the instruction response received by the response receiving unit has contents showing that the execution instruction exists; and an instruction receiving unit for receiving the execution instruction as a response to the instruction sending request sent by the request sending unit, in the form of the HTTP response to the HTTP request which is the instruction sending request, from the instruction apparatus using the communication device, and the instruction executing unit executes the execution instruction received by the instruction receiving unit using the execution device.

The terminal apparatus further includes:

a result sending unit for sending a result of the execution instruction executed by the instruction executing unit as an executed result, in the form of the HTTP request, to the instruction apparatus using the communication device, and the instruction receiving unit further receives another execution instruction to be executed by the execution device, in the form of the HTTP response to the HTTP request which is the executed result sent by the result sending unit, from the instruction apparatus using the communication device.

The inquiry sending unit, when the instruction response received by the response receiving unit has contents showing no execution instruction exists, further sends the instruction inquiry to the server apparatus using the communication device.

According to the present invention, a server apparatus having a communication device communicating with a terminal apparatus via a network, the server apparatus includes:

an inquiry receiving unit for receiving an instruction inquiry to inquire about existence/absence of an execution instruction to be executed by the terminal apparatus, in a form of an HTTP request, from the terminal apparatus using the communication device; and a response sending unit for sending a response to the instruction inquiry received by the inquiry receiving unit as an instruction response, in a form of an HTTP response to the HTTP request which is the instruction inquiry, to the terminal apparatus using the communication device.

The server apparatus further includes:

a result receiving unit for receiving a result of the execution instruction executed by the terminal apparatus as an executed result, in the form of the HTTP request, from the terminal apparatus using the communication device, and the response sending unit further sends existence/absence of another execution instruction to be executed by the terminal apparatus as the instruction response, in the form of HTTP response to the HTTP request which is the executed result, to the terminal apparatus using the communication device.

The response sending unit, when the execution instruction to be executed by the terminal apparatus exists, sends the instruction response including the execution instruction to the terminal apparatus using the communication device.

The server apparatus further includes:

a notification receiving unit for receiving the execution instruction from a notification apparatus notifying of the execution instruction to be executed by the terminal apparatus, and the response sending unit, when the notification receiving unit receives the execution instruction from the notification apparatus sends the instruction response having contents showing that the execution instruction exists to the terminal apparatus using the communication device, and when the notification receiving unit does not receive the execution instruction from the notification apparatus while waiting for a predetermined time, sends the instruction response having contents showing that no execution instruction exists to the terminal apparatus using the communication device.

The server apparatus further includes:

an existence obtaining unit for obtaining a notification that the execution instruction exists from an instruction apparatus notifying of existence of the execution instruction to be executed by the terminal apparatus, and the response sending unit, when the existence obtaining unit obtains the notification that the execution instruction exists from the instruction apparatus sends the instruction response having contents showing that the execution instruction exists, to the terminal apparatus using the communication device, and when the existence obtaining unit does not receive the notification that the execution instruction exists from the instruction apparatus while waiting for a predetermined time, sends the instruction response having contents showing that no execution instruction exists, to the terminal apparatus using the communication device.

According to the present invention, an instruction apparatus having a communication device communicating with a terminal apparatus via a network, the instruction apparatus includes:

a request receiving unit for receiving an instruction sending request to request transmission of an execution instruction to be executed by the terminal apparatus, in a form of an HTTP request, from the terminal apparatus using the communication device; and an instruction sending unit for sending the execution instruction as a response to the instruction sending request received by the request receiving unit, in a form of an HTTP response to the HTTP request which is the instruction sending request, to the terminal apparatus using the communication device.

The instruction apparatus further includes:

a result receiving unit for receiving a result of the execution instruction executed by the terminal apparatus as an executed result in the form of the HTTP request from the terminal apparatus using the communication device, and the instruction sending unit further sends another execution instruction to be executed by the terminal apparatus, in the form of the HTTP response to the HTTP request which is the executed result, to the terminal apparatus using the communication device.

The instruction apparatus further includes:

a notification receiving unit for receiving the execution instruction from a notification apparatus notifying of the execution instruction to be executed by the terminal apparatus; and an existence notifying unit for notifying a server apparatus, which informs the terminal apparatus of existence/absence of the execution instruction, that the execution instruction exists when the notification receiving unit receives the execution instruction.

EFFECT OF THE INVENTION

According to the present invention, for example, the access is sent from the server apparatus to the terminal apparatus in a form of an HTTP response, in response to an HTTP request sent to the server apparatus from the terminal apparatus so that an effect can be brought that an access from the server apparatus to the terminal apparatus is made possible without changing the setting of firewall, etc. which intervene between them.

BEST MODES FOR CARRYING OUT THE INVENTION

Embodiment 1

The first embodiment will be explained by referring to FIGS. 1 through 8.

FIG. 1 is a system configuration showing an example of a general configuration of a remote operation system 600 according to the present embodiment.

The remote operation system 600 includes a terminal apparatus 100, a router apparatus 500 (a gateway apparatus), a server apparatus 200, and an application apparatus 300 (an example of a notification apparatus).

The router apparatus 500, the server apparatus 200, and the application apparatus 300 are connected to the Internet and able to mutually communicate.

The terminal apparatus 100 is connected to a router apparatus 500 via LAN 450, connected to the Internet through the router apparatus 500, and able to communicate with apparatuses (for example, the server apparatus 200) connected to the Internet.

The router apparatus 500 includes a firewall function.

The router apparatus 500 allows communication from the terminal apparatus 100 to the apparatuses at the Internet side (for example, the server apparatus 200). Further, as a response to such communication, the router apparatus 500 also allows communication from the apparatuses at the Internet side to the terminal apparatus 100. However, the router apparatus 500 prohibits communication unless it is a response to the communication from the terminal apparatus 100.

Accordingly, although the terminal apparatus 100 can access the server apparatus 200, accessing the terminal apparatus 100 from the server apparatus 200 is not allowed.

Further, the router apparatus 500 includes a NAPT function.

The router apparatus 500 converts a local IP address, which is only valid within the LAN 450, of the terminal apparatus 100 by the NAPT function, and connects to the apparatuses at the Internet side.

The application apparatus 300 inputs an instruction (execution instruction) to be executed by the terminal apparatus 100. The application apparatus 300 accesses the server apparatus 200 via the Internet 400 to send the execution instruction inputted.

The server apparatus 200 accesses the terminal apparatus 100 through the router apparatus 500 to send the execution instruction received from the application apparatus 300 to the terminal apparatus 100.

The terminal apparatus 100 executes the execution instruction, and sends an executed result to the server apparatus 200 through the router apparatus 500 via the Internet 400.

The server apparatus 200 receives the executed result from the terminal apparatus 100.

The application apparatus 300 accesses the server apparatus 200 via the Internet 400 to obtain the executed result received by the server apparatus 200.

FIG. 2 is a hardware configuration showing an example of hardware configuration of the terminal apparatus 100 according to the present embodiment.

FIG. 3 is a hardware configuration showing an example of hardware configuration of the server apparatus 200 and the application apparatus 300 according to the present embodiment.

FIG. 4 is a hardware configuration showing an example of hardware configuration of the router apparatus 500 according to the present embodiment.

The terminal apparatus 100, the server apparatus 200, the application apparatus 300, and the router apparatus 500 include a CPU 901 (Central Processing Unit), a display device 902 (for example, a CRT (Cathode Ray Tube) device, an LCD (Liquid Crystal Display) device, etc.), an input device 903 (for example, a keyboard, etc.), a memory device 904 (for example, an internal memory device such as a ROM (Read Only Memory), a RAM (Random Access Memory), etc., an external memory device such as a HDD (Hard Disk Drive) device, an SD (Secured Digital) memory, etc.), and network interface devices 905 and 906.

The CPU 901 implements respective function blocks explained below by executing programs stored by the memory device 904.

The display device 902 displays executed results, etc. of the programs executed by the CPU 901.

The input device 903 inputs an instruction for the CPU 901.

The memory device 904 stores data of the executed result, etc. other than the programs to be executed by the CPU 901.

The network interface device 905 is connected to the Internet 400 and communicates with other apparatuses connected to the Internet 400.

The network interface device 906 is connected to the LAN 450 and communicates with other apparatuses connected to the LAN 450.

The terminal apparatus 100 further includes an execution device 910.

The execution device 910 is a device which actually executes various functions based on the execution instruction from the application apparatus 300.

Here, the terminal apparatus 100 does not always have to be physically one apparatus. For example, the execution device 910 can be connected to other apparatuses via the LAN 450 or a unique network such as infrared communication, etc. In such a case, if a whole system, including the execution device 910 connected via the LAN 450, etc. functions as the terminal apparatus 100 which will be explained below, the system can be "the terminal apparatus" discussed here.

FIG. 5 is a block diagram showing an example of a configuration of functional blocks of the terminal apparatus 100, the server apparatus 200, and the application apparatus 300 according to the present embodiment.

Here, the router apparatus 500, the LAN 450, and the Internet 400 are omitted in FIG. 5.

The terminal apparatus 100 includes a server accessing unit 110, a terminal controlling unit 120 (an example of an inquiry sending unit/result sending unit), a reply data analyzing unit 130 (an example of response receiving unit), and a command executing unit 140 (an example of an instruction executing unit).

The server accessing unit 110 communicates with the server apparatus 200 using the network interface device 906. HTTP is used for a communication protocol.

Here, although HTTP is used in this embodiment, the communication protocol is not limited to HTTP but can be other protocol which is allowed to pass in a normal gateway apparatus, a firewall, or a proxy such as HTTPS (Hyper Text Transfer Protocol over Secure Sockets Layer), etc.

In the following explanation, it is assumed the phrase "HTTP request" includes messages, when protocol other than HTTP is used, corresponding to the HTTP request in the HTTP protocol. Further, it is assumed the phrase "HTTP response" includes messages, when protocol other than HTTP is used, corresponding to the HTTP response in the HTTP protocol.

The terminal controlling unit 120 generates an instruction inquiry to inquire of the server apparatus 200 if there is an execution instruction for the terminal apparatus 100 or not, and makes the server accessing unit 110 send it to the server apparatus 200. Further, the terminal controlling unit 120 obtains a result of the execution instruction executed by the command executing unit 140, and makes the server accessing unit 110 send it to the server accessing unit 110 as a command executed result.

The reply data analyzing unit 130 analyzes the data (reply data) received by the server accessing unit 110 from the server apparatus 200. The reply data analyzing unit 130 judges if an execution instruction is included in the reply data or not, and if included, notifies the command executing unit 140 of the execution instruction. If not included, it is notified to the terminal controlling unit 120 that the execution instruction is not included.

The command executing unit 140 executes the execution instruction, notified by the reply data analyzing unit 130, using the execution device 910.

The server apparatus 200 includes a terminal access receiving unit 210, a server controlling unit 220 (an example of a response sending unit), an access data analyzing unit 230 (an example of an inquiry receiving unit/result receiving unit), and an application access receiving unit 240 (an example of notification receiving unit).

The terminal access receiving unit 210 communicates with the terminal apparatus 100 using the network interface device 905. HTTP (or HTTPS, etc.) is used for the communication protocol.

The server controlling unit 220 generates a response (instruction response) for the instruction inquiry from the terminal apparatus 100, and makes the terminal access receiving unit 210 send it to the terminal apparatus 100. Further, the server controlling unit 220 obtains a result of the execution instruction executed by the terminal apparatus 100 (executed result) from the access data analyzing unit 230, and makes the application access receiving unit 240 send it to the application apparatus 300.

The access data analyzing unit 230 analyzes data received by the terminal access receiving unit 210 from the terminal apparatus 100 (terminal access data) and data received by the application access receiving unit 240 from the application apparatus 300 (application access data), and notifies the server controlling unit 220 of the analyzed result.

The application access receiving unit 240 communicates with the application apparatus 300 using the network interface device 905. The application access receiving unit 240 receives a command (instruction notification) from the application apparatus 300 and sends a command executed result (executed result) to the application apparatus 300.

The application apparatus 300 includes an application system 310, an instruction inputting unit 320, and a result displaying unit 330.

The application system 310 communicates with the server apparatus 200 using the network interface device 905.

The instruction inputting unit 320 inputs an execution instruction for the terminal apparatus 100 using the input device 903. The execution instruction inputted is sent to the server apparatus 200 by the application system 310.

The result displaying unit 330 displays a result of the execution instruction executed by the terminal apparatus 100 using the display device 902. The executed result to be displayed is received from the server apparatus 200 by the application system 310.

Next, an operation of the terminal apparatus 100 will be explained.

FIG. 6 is a flowchart showing an example of processing of the terminal apparatus 100 according to this embodiment.

At S11, the terminal controlling unit 120 generates an instruction inquiry. The instruction inquiry inquires of the server apparatus 200 if there is an execution instruction for the terminal apparatus 100 or not.

At S12, the server accessing unit 110 sends the instruction inquiry generated by the terminal controlling unit 120 to the server apparatus 200.

At this time, HTTP (or HTTPS, etc.) is used for the communication protocol. For example, the instruction inquiry is sent in a form of "GET" method which specifies a file name storing an instruction response for the terminal apparatus 100.

At S13, the server accessing unit 110 receives a response (reply data) for the instruction inquiry sent at S12.

The communication protocol at this time is also HTTP (or HTTPS, etc.). For example, reply data is received in a form in which contents of a file storing the instruction response is transferred as HTTP response for the "GET" method sent at S12.

At S14, the reply data analyzing unit 130 analyzes to check if the reply data (instruction response) includes a command (execution instruction) or not. Namely, the reply data analyzing unit 130 analyzes the reply data to judge if the command is included or not.

At S15, processes are branched based on the analyzed result of the reply data analyzing unit 130. If the command is not included in the reply data, the operation returns to S11 by the terminal controlling unit 120. If the command is included in the reply data, the operation proceeds to S16.

At S16, the reply data analyzing unit 130 gives the command included in the reply data to the command executing unit 140. The command executing unit 140 executes the given command using the execution device 910.

At S17, the terminal controlling unit 120 obtains a result of the command executed by the command executing unit 140 as a command executed result. The command executed result is given to the server accessing unit 110.

At S18, the server accessing unit 110 receives the command executed result obtained by the terminal controlling unit 120, adds the data to send to the server apparatus 200.

HTTP (or HTTPS, etc.) is also used for the communication protocol at this time. For example, the command executed result is sent as a parameter of the "GET" method. Or, a "POST" method can be also used.

Then, the operation proceeds to S13, the server accessing unit 110 receives reply data as the HTTP response for the "GET" method which is the command executed result sent at S18, and the above process is repeated.

In this way, the response for the command executed result is also treated equally to the response for the instruction inquiry. This eliminates one transmission of the instruction inquiry, which brings an effect to reduce traffic of the communication.

Here, if the reply data cannot be received at S13 because of communication failure, etc., the operation returns to S11 to resend the instruction inquiry.

Next, the operation of the server apparatus 200 will be explained.

FIG. 7 is a flowchart showing an example of processing by the server apparatus 200 according to the present embodiment.

At S21, the terminal access receiving unit 210 receives the instruction inquiry (HTTP request) from the terminal apparatus 100.

At S22, the application access receiving unit 240 judges if the instruction notification is received from the application apparatus 300 or not. If received, the operation proceeds to S27. If not received, the operation proceeds to S23.

At S23, the server controlling unit 220 measures a time that has passed since the terminal access receiving unit 210 received the HTTP request (instruction inquiry) from the terminal apparatus 100, and judges if a predetermined time has passed or not.

At S24, processes are branched based on a judged result by the server controlling unit 220. If it is before the predetermined time has passed, the operation returns to S22 to wait for receiving an access from the application apparatus 300. If the predetermined time has passed, the operation proceeds to S25.

At S25, if no access is received from the application apparatus 300 until the predetermined time passes, the server controlling unit 220 judges that there is no execution instruction to be executed by the terminal apparatus 100. The server controlling unit 220 generates reply data (instruction response) without including an execution instruction. In this embodiment, if the reply data does not include the execution instruction, it means there is no execution instruction to be executed by the terminal apparatus 100.

At S26, the terminal access receiving unit 210 sends the reply data generated by the server controlling unit 220 to the terminal apparatus 100. At this time, the reply data is sent as a response (HTTP response) for the HTTP request (instruction inquiry) from the terminal apparatus 100.

After the above processes are finished, the operation returns to S21 to wait for the next access from the terminal apparatus 100.

At S27, the access data analyzing unit 230 analyzes the application access (instruction notification) received by the application access receiving unit 240 and obtains the execution instruction included in the access. The access data analyzing unit 230 gives the obtained execution instruction to the server controlling unit 220.

At S28, the server controlling unit 220 generates reply data including the execution instruction received from the access data analyzing unit 230.

At S29, the terminal access receiving unit 210 sends the reply data generated by the server controlling unit 220 to the terminal apparatus 100 as the HTTP response for the HTTP request (instruction inquiry).

At S30, the terminal access receiving unit 210 receives the command executed result (HTTP request) from the terminal apparatus 100.

At S31, the access data analyzing unit 230 obtains the command executed result received by the terminal access receiving unit 210, and the application access receiving unit 240 sends to the application apparatus 300.

After the above processes are finished, the operation returns to S22 to wait for an access from the application apparatus 300.

Next, the general operation of the remote operation system 600 will be explained.

FIG. 8 is a sequence diagram showing an example of messages exchanged among the terminal apparatus 100, the server apparatus 200, and the application apparatus 300 according to the present embodiment.

The messages exchanged between the terminal apparatus 100 and the server apparatus 200 are passed through the router apparatus 500. The router apparatus 500 includes a firewall function, which passes only allowed messages.

The terminal apparatus 100 sends an instruction inquiry 711 to the server apparatus 200 as the HTTP request (S12).

The server accessing unit 110 of the terminal apparatus 100 starts a TCP (Transmission Control Protocol) session with the server apparatus 200 at sending the instruction inquiry 711.

The router apparatus 500 discriminates that the terminal apparatus 100 starts the TCP session. The router apparatus 500 judges that the communication in the TCP session is an access from the terminal apparatus 100 and its response, and allows the communication.

The router apparatus 500 receives the instruction inquiry 711 and transfers to the server apparatus 200. The server apparatus 200 receives the instruction inquiry 711 (S21).

Since there is no access from the application apparatus 300 after waiting for the predetermined time, the server apparatus 200 sends reply data 721 (instruction response) without including a command (execution instruction) to the terminal apparatus 100 (S26).

The reply data 721 is sent as the HTTP response in the TCP session which the terminal apparatus 100 has started.

Here, in order to prevent the router apparatus 500, etc. from finishing the TCP session because it is judged to be no communication status, a waiting time, until sending the reply data 721 from receiving the instruction inquiry 711 by the server apparatus 200, is prescribed to be shorter than a time period by which it is judged to be no communication status.

The router apparatus 500 receives the reply data 721, and transfers the reply data 721 to the terminal apparatus 100, since it is the terminal apparatus 100 that has started the TCP session.

Here, in this example, the firewall function of the router apparatus 500 judges if the communication should be transferred or not based on the apparatus which has started the TCP session; however, another firewall, in which the router apparatus 500 further examines contents of the communication to judge if it should be transferred or not, is also used.

Also in such a case, the reply data 721 sent from the server apparatus 200 to the terminal apparatus 100 is in a form of the HTTP response for the HTTP request sent by the terminal apparatus 100, so that the communication is quite the same as the one in the case of accessing normal websites. Since normal setting should allow browsing websites, the router apparatus 500 does not prohibit the transmission of the reply data 721 but transfers to the terminal apparatus 100.

The terminal apparatus 100 receives the reply data 721 (S13). Since the reply data 721 does not include a command, the terminal apparatus 100 instantly sends the next instruction inquiry 712 to the server apparatus 200 as the HTTP request (S12).

At this time, the TCP session, which has been started at the time of sending the instruction inquiry 711, is maintained, and the instruction inquiry 712 is sent in the same session.

The router apparatus 500 receives the instruction inquiry 712, allows this communication, and transfers to the server apparatus 200.

The server apparatus 200 receives the instruction inquiry 712 (S21).

On the other hand, in the application apparatus 300, the instruction inputting unit 320 inputs the command (execution instruction). The command inputted is sent to the server apparatus 200 as an application access 731 (instruction notification) by the application system 310.

The server apparatus 200 receives the application access 731 (S22). This receipt is before the predetermined time has passed since the instruction inquiry 712 was received, the server apparatus 200 instantly sends reply data 722 (with command) to the terminal apparatus 100 as the HTTP response (S29).

Here, if the server apparatus 200 receives the application access after the predetermined time has passed, the next instruction inquiry from the terminal apparatus 100 is awaited, and the reply data to the next instruction inquiry should be sent instantly.

The reply data 722 includes the command included in the application access 731.

The router apparatus 500 receives the reply data 722, allows the communication, and transfers to the terminal apparatus 100.

The terminal apparatus 100 receives the reply data 722 (S13). Since the reply data 722 includes the command, the terminal apparatus 100 executes the command (S16).

The terminal apparatus 100 sends a result of the command executed to the server apparatus 200 as a command executed result 793 in a form of the HTTP request (S18).

Here, if it takes time to execute the command, the instruction inquiry can be sent without waiting for completion of the command execution in order to prevent the TCP session from finishing.

The router apparatus 500 receives the command executed result 793, allows the communication, and transfers to the server apparatus 200.

The server apparatus 200 receives the command executed result 793 (S30). The server apparatus 200 sends the command executed result received to the application apparatus 300 as an application reply 741 (S31).

The application apparatus 300 receives the application reply 741. The result displaying unit 330 of the application apparatus 300 displays the command executed result included in the application reply 741 using the display device 902.

The server apparatus 200 waits until the predetermined time has passed since the command executed result 793 was received, and because there is no access from the application apparatus 300, the server apparatus 200 sends reply data 723 without including a command to the terminal apparatus 100 as the HTTP response.

As discussed, the communication between the terminal apparatus 100 and the server apparatus 200 is totally implemented by the HTTP (or HTTPS) access (request) from the terminal apparatus 100 to the server apparatus 200 and its reply (response).

This brings an effect that the communication is possible regardless of setting (for example, firewall, NAPT, Web proxy, etc.) of apparatuses (for example, the router apparatus 500) intervened between the terminal apparatus 100 and the server apparatus 200.

Therefore, it also brings an effect that the security can be highly maintained in addition to that there is no need to change the setting of firewall, etc. for carrying out the communication, which eliminates complicated work.

This communication enables the server apparatus 200 to give a control command to the terminal apparatus 100, which enables the server apparatus 200 to control the terminal apparatus 100.

Further, if the time from the receipt of the instruction response to the transmission of the next instruction inquiry of the terminal apparatus 100 is sufficiently short, such status is almost the same as the one in the case of constant connection to the server apparatus 200. Therefore, there is little time delay in controlling the terminal apparatus 100, which enables instant control.

As discussed, the terminal apparatus 100 makes HTTP or HTTPS access to the server apparatus 200, connected status is maintained for a certain period, and reply is once returned. Then, the terminal apparatus 100 immediately accesses the server apparatus 200 again. This brings the same effect as the constant connection. If the constant connection is actually done, the router apparatus 500, etc. may judge that it is no communication status to automatically disconnect the TCP session; however, this embodiment does not allow such event. Further, there is no need to do periodical communication (KeepAlive) in order to prevent the disconnection of the session.

Further, since the communication is carried out in the TCP between the terminal apparatus 100 and the server apparatus 200, so that the communication becomes more secure and certain compared with a case of using UDP, which brings an effect to increase the reliability.

Different from the case of using UDP, there is no need to carry out a complicated process such as processing for communication errors, which facilitates the processing at an application level.

In order to establish the TCP session, negotiation is necessary, which increases load than the communication by UDP, which consumes more resource.

However, according to the present embodiment, the establishing operation of the TCP session is necessary only once at the beginning, and the subsequent communication is carried out by the TCP session which has been established at the beginning. Therefore, another effect can be brought that it is possible to minimize the consumption of resource generated by using the TCP.

Embodiment 2

The second embodiment will be explained by referring to FIGS. 9 through 12.

The general configuration of the remote operation system 600 and the hardware configuration of the terminal apparatus 100, the server apparatus 200, the application apparatus 300 (an example of notification apparatus), and the router apparatus 500 are the same as the ones that have been explained in the first embodiment, so that the explanation is omitted here.

FIG. 9 is a block configuration diagram showing an example of functional block configuration of the terminal apparatus 100, the server apparatus 200, and the application apparatus 300 according to the present embodiment.

The terminal apparatus 100 includes a server access preparing unit 115, a terminal controlling unit 120 (an example of an inquiry sending unit), a request data analyzing unit 135 (an example of a response receiving unit), a server communicating unit 116 (an example of request sending unit/instruction receiving unit/result sending unit), and a command executing unit 140 (an example of an instruction executing unit).

Among the above, the command executing unit 140 is the same as the one that has been explained in the first embodiment, so that the explanation is omitted here.

The server access preparing unit 115 communicates with a terminal access preparing unit 215 of the server apparatus 200 using the network interface device 906. HTTP (or HTTPS, etc.) is used for the communication protocol.

The terminal controlling unit 120 generates an instruction inquiry to inquire if there is an execution instruction for the terminal apparatus 100 or not, and makes the server access preparing unit 115 send to the terminal access preparing unit 215 of the server apparatus 200.

The request data analyzing unit 135 analyzes the data (request data) received by the server access preparing unit 115 from the terminal access preparing unit 215 of the server apparatus 200. The request data analyzing unit 135 judges if the request data includes connection request or not, and if it is included, the connection request is notified to the server communicating unit 116. If not included, the fact is notified to the terminal controlling unit 120.

The server communicating unit 116 communicates with the terminal communicating unit 216 of the server apparatus 200 using the network interface device 906. HTTP (or HTTPS) is used for the communication protocol.

When the connection request is notified from the request data analyzing unit 135, the server communicating unit 116 sends the instruction sending request to the terminal communicating unit 216 of the server apparatus 200.

The server communicating unit 116 further receives the command (execution instruction) sent by the terminal communicating unit 216 of the server apparatus 200 as a response to the instruction sending request.

The server communicating unit 116 notifies the command executing unit 140 of the received command.

The server communicating unit 116 obtains a result of the notified command executed by the command executing unit 140, and sends to the terminal communicating unit 216 of the server apparatus 200 as a command executed result (executed result).

The server apparatus 200 includes a terminal access preparing unit 215 (an example of an inquiry receiving unit), a server controlling unit 220 (an example of an existence obtaining unit/response sending unit), a terminal communicating unit 216 (an example of a request receiving unit/instruction sending unit/result receiving unit), and an application access receiving unit 240 (an example of a notification receiving unit/existence notifying unit).

The terminal access preparing unit 215 communicates with the server access preparing unit 115 of the terminal apparatus 100 using the network interface device 905. HTTP (or HTTPS, etc.) is used for the communication protocol.

The server controlling unit 220 generates a response (instruction response) for the instruction inquiry from the terminal apparatus 100, and makes the terminal access preparing unit 215 send to the server access preparing unit 115 of the terminal apparatus 100.

The terminal communicating unit 216 communicates with the server communicating unit 116 of the terminal apparatus 100 using the network interface device 905. HTTP (or HTTPS, etc.) is used for the communication protocol.

The terminal communicating unit 216 receives the instruction sending request sent by the server communicating unit 116 of the terminal apparatus 100.

When the instruction sending request is received, the terminal communicating unit 216 sends the command (execution instruction) to the server communicating unit 116 of the terminal apparatus 100.

The terminal communicating unit 216 receives a result of the command executed by the terminal apparatus 100 from the server communicating unit 116 of the terminal apparatus 100 as a command executed result (executed result).

The application access receiving unit 240 communicates with the application apparatus 300 using the network interface device 905. The command (instruction notification) is received from the application apparatus 300, and the command executed result (executed result) is sent to the application apparatus 300.

The application apparatus 300 is the same as the one that has been explained in the first embodiment, so that the explanation is omitted here.

Next, the operation of the terminal apparatus 100 will be explained.

FIG. 10 is a flowchart showing an example of processing of the terminal apparatus 100 according to the present embodiment.

At S41, the terminal controlling unit 120 generates an instruction inquiry.

At S42, the server access preparing unit 115 sends the instruction inquiry generated by the terminal controlling unit 120 to the terminal access preparing unit 215 of the server apparatus 200. At this time, HTTP (or HTTPS, etc.) is used for the communication protocol, and the instruction is sent as an HTTP request (for example, "GET" method).

At S43, the server access preparing unit 115 receives a response (request data) to the instruction inquiry sent at S42. The communication protocol at this time is also HTTP, and the request data is received as an HTTP response to the "GET" method, for example.

At S44, the request data analyzing unit 135 analyzes to check if a connection request is included in the request data (an instruction response). If the connection request included, it means there is a command (an execution instruction) to be executed by the terminal apparatus 100 in the server apparatus 200.

At S45, processes are branched based on the analyzed result of the request data analyzing unit 135.

If the connection request is not included in the request data, the operation returns to S41 to send the next instruction inquiry.

If the connection request is included in the request data, the operation proceeds to S46.

At S46, the server communicating unit 116 receives the notification from the request data analyzing unit 135, generates an instruction sending request to request transmission of the command which exists in the server apparatus 200, and sends to the terminal communicating unit 216 of the server apparatus 200 as the HTTP request (for example, "GET" method).

At S47, the server communicating unit 116 receives the command (the execution instruction) as a response to the instruction sending request sent at S46. For example, it is received as the HTTP response to "GET" method sent at S46.

At S48, the command executing unit 140 receives the command from the server communicating unit 116 and executes the received command.

At S49, the server communicating unit 116 obtains a result of the command executed by the command executing unit 140 as a command executed result. The server communicating unit 116 sends the obtained command executed result to the terminal communicating unit 216 of the server apparatus 200 as the HTTP request.

At S50, the server communicating unit 116 judges if the HTTP response, to the HTTP request sent at S49, is received within a predetermined time.

If the HTTP response is received within the predetermined time, the response includes the next command, so that the operation returns to S47 to process the next command.

If the HTTP response is not received within the predetermined time, there is no command to be executed subsequently, so that the operation returns to S41.

Here, before the predetermined time has passed, the HTTP response which means "command ends" can be received, the server communicating unit 116 can discriminates the fact, and the operation can return to S41.

Next, the operation of the server apparatus 200 will be explained.

FIG. 11 is a flowchart showing an example of processing of the server apparatus 200 (the terminal access preparing unit 215, the server controlling unit 220) according to the present embodiment.

At S61, the terminal access preparing unit 215 receives the instruction inquiry (the HTTP request) from the terminal apparatus 100.

At S62, the server controlling unit 220 judges if a notification (an existence notification) that there is a command to be executed by the terminal apparatus 100 is received from the application access receiving unit 240 or not. If the existence notification is received, the operation proceeds to S67. If the existence notification is not received, the operation proceeds to S63.

At S67, the server controlling unit 220 generates request data including a connection request to request an access to the terminal communicating unit 216 from the terminal apparatus 100. Then, the operation proceeds to S66.

At S63, the server controlling unit 220 measures a time that has passed since the terminal access preparing unit 215 receives the HTTP request (the instruction inquiry) from the terminal apparatus 100, and judges if a predetermined time has passed or not.

At S64, processes are branched based on a judged result of the server controlling unit 220. If it is before the predetermined time has passed, the operation returns to S62 to wait for receiving an access from the application access receiving unit 240. If the predetermined time has passed, the operation proceeds to S65.

At S65, the server controlling unit 220 generates request data without including a connection request to request an access (namely, not requesting an access) to the terminal communicating unit 216 from the terminal apparatus 100.

At S66, the terminal access preparing unit 215 sends the request data generated by the server controlling unit 220 at S65 or S67 to the server access preparing unit 115 of the terminal apparatus 100 as the HTTP response. After the above processes are finished, the operation returns to S61 to wait for the next instruction inquiry.

FIG. 12 is a flowchart showing an example of processing of the server apparatus 200 (the terminal communicating unit 216, the application access receiving unit 240) according to the present embodiment.

At S71, the application access receiving unit 240 receives the instruction notification including the command (the execution instruction) to be executed by the terminal apparatus 100 from the application apparatus 300.

At S72, the application access receiving unit 240 notifies the server controlling unit 220 that there is the command to be executed by the terminal apparatus 100 (the existence notification).

At S73, the terminal communicating unit 216 receives an instruction sending request (the HTTP request) from the server communicating unit 116 of the terminal apparatus 100.

At S74, the application access receiving unit 240 obtains the command included in the received instruction notification.

At S75, the terminal communicating unit 216 sends the command obtained by the application access receiving unit 240 to the server communicating unit 116 of the terminal apparatus 100 as the HTTP response.

At S76, the terminal communicating unit 216 receives a result of the sent command executed by the terminal apparatus 100 from the server communicating unit 116 of the terminal apparatus 100 as a command executed result.

At S77, the application access receiving unit 240 sends the command executed result received by the terminal communicating unit 216 to the application apparatus 300.

At S78, the application access receiving unit 240 judges if the instruction notification is received from the application apparatus 300 or not. If received, the operation proceeds to S74 to send the received command to the terminal apparatus 100. If not received, the operation proceeds to S79.

At S79, the application access receiving unit 240 measures a time that has passed since the terminal communicating unit 216 receives the HTTP request (the command executed result), and judges if a predetermined time has passed or not.

At S80, processes are branched based on a judged result by the application access receiving unit 240. If it is before the predetermined time has passed, the operation returns to S78 to wait for receiving an access from the application apparatus 300. If the predetermined time has passed, the operation returns to S71 to wait for an access from the application apparatus 300.

There are two kinds of communication between the terminal apparatus 100 and the server apparatus 200; that is, communication between the server access preparing unit 115 and the terminal access preparing unit 215 and communication between the server communicating unit 116 and the terminal communicating unit 216. HTTP protocol (or HTTPS, etc.) is used for both of the two kinds of communication.

For the communication between the server access preparing unit 115 and the terminal access preparing unit 215, a TCP session is established at the time of starting the communication, and then the session is maintained by periodically exchanging instruction inquiries/instruction responses.

On the other hand, since the communication is not so frequent between the server communicating unit 116 and the terminal communicating unit 216, when the session is disconnected by timeout after the TCP session is established, the session is connected again when it becomes necessary. Or, the session can be disconnected explicitly when the command ends. Further, the session can be also disconnected by a command to instruct to disconnect the TCP session.

In this way, the communication is done between the terminal apparatus 100 and the server apparatus 200 by dividing into the communication between the server access preparing unit 115 and the terminal access preparing unit 215 and the communication between the server communicating unit 116 and the terminal communicating unit 216. The two communications are discriminated, for example, by specifying different port numbers for the terminal access preparing unit 215 from the port numbers used by the terminal communicating unit 216. Or, the two communications can be also discriminated by using two separate IP addresses.

The terminal access preparing unit 215 handles instruction inquires/instruction responses. The instruction inquires/instruction responses should be periodically exchanged even if there is no command to be executed by the terminal apparatus 100, so that the number is large, though the processing per time is light. In particular, when one server apparatus 200 manages a lot of terminal apparatuses 100, the number of instruction inquires/instruction responses becomes huge.

On the other hand, the terminal communicating unit 216 handles instruction sending requests/execution instructions/executed results. The instruction sending requests/execution instructions/executed results are exchanged only when there is an execution instruction to be executed by the terminal apparatus 100, so that the processing per time is heavy, though the number is small.

By discriminating these two kinds of communications, it is possible to eliminate a process to determine that it is an instruction inquiry when the instruction inquiry, which occupies most of the messages received by the server apparatus 200, is received. Although the load, which can be eliminated by this, is small, it brings an effect to reduce significant load as a whole, since the number of instruction inquires is huge.

Embodiment 3

The third embodiment will be explained by referring to FIGS. 13 through 15.

FIG. 13 is a system configuration showing an example of general configuration of a remote operation system 600 according to the present embodiment.

The remote operation system 600 includes the terminal apparatus 100, the router apparatus 500, the server apparatus 200, an instruction apparatus 250, and the application apparatus 300 (an example of a notification apparatus).

The hardware configuration of the terminal apparatus 100, the router apparatus 500, the server apparatus 200, the application apparatus 300 are the same as the ones that have been explained in the first embodiment, so that the explanation is omitted here.

A hardware configuration of the instruction apparatus 250 is the same as the one of the server apparatus 200.

FIG. 14 is a block configuration diagram showing an example of functional block configuration of the terminal apparatus 100, the server apparatus 200, the instruction apparatus 250, and the application apparatus 300 according to the present embodiment.

Since the terminal apparatus 100 and the application apparatus 300 are the same as the ones that have been explained in the second embodiment, so that the explanation is omitted here.

The server apparatus 200 includes the terminal access preparing unit 215 and the server controlling unit 220.

The instruction apparatus 250 includes the terminal communicating unit 216 and the application access receiving unit 240.

Since the terminal access preparing unit 215, the server controlling unit 220, the terminal communicating unit 216, and the application access receiving unit 240 are the same as the functional blocks of the server apparatus 200 that have been explained in the second embodiment, so that the explanation is omitted here.

In the present embodiment, the server apparatus 200 of the second embodiment is divided into two apparatuses (the server apparatus 200 and the instruction apparatus 250).

FIG. 15 is a sequence diagram showing an example of messages exchanged among the terminal apparatus 100, the server apparatus 200, the instruction apparatus 250, and the application apparatus 300 according to the present embodiment.

The terminal apparatus 100 sends the instruction inquiry 711 to the server apparatus 200 (S42).

The server apparatus 200 receives the instruction inquiry 711 (S61).

On the other hand, in the application apparatus 300, the instruction inputting unit 320 inputs a command (an execution instruction) using the input device 903. The application system 310 sends the inputted command to the instruction apparatus 250 as the application access 731 (the instruction notification).

The instruction apparatus 250 receives the application access 731 (S71).

The instruction apparatus 250 sends an existence notification 771 to notify that there is a command to be executed by the terminal apparatus 100 to the server apparatus 200 (S72).

The server apparatus 200 receives the existence notification 771 (S62). It is received before the predetermined time has passed since the instruction inquiry 711 was received, so that the server apparatus 200 sends the request data 751 (command exists) to the terminal apparatus 100 (S66).

Here, when there are plural instruction apparatuses 250, it is possible to specify which instruction apparatus 250 to be accessed by the terminal apparatus 100 by including information showing the instruction apparatus 250 (for example, an IP address) having the command to be executed by the terminal apparatus 100.

The terminal apparatus 100 receives the request data 751 (the instruction response) (S43).

The terminal apparatus 100 analyzes the request data 751, and since it shows that the command exists, an instruction sending request 761 is sent to the instruction apparatus 250 (S46).

The instruction apparatus 250 receives the instruction sending request 761 (S73).

The instruction apparatus 250 sends a command 781 (an execution instruction) to the terminal apparatus 100 (S75).

The terminal apparatus 100 receives the command 781 (S47).

The terminal apparatus 100 executes the command 781 (S48).

The terminal apparatus 100 sends an executed result of the command 781 to the instruction apparatus 250 as a command executed result 792 (an executed result) (S50).

The instruction apparatus 250 receives the command executed result 792 (S76).

The instruction apparatus 250 sends the received command executed result 792 to the application apparatus 300 as an application reply 741.

The application apparatus 300 receives the application reply 741. The command executed result is obtained from the received application reply 741 and displayed by the result displaying unit 330 using the display device 902.

Here, it is assumed that a user who watches the executed result inputs the next command at the application apparatus 300.

The instruction inputting unit 320 inputs the command, and the application system 310 sends the command to the instruction apparatus 250 as an application access 732 (an instruction notification).

The instruction apparatus 250 receives the application access 732 (S78). It is received before the predetermined time has passed since the command executed result 792 is received, so that the instruction apparatus 250 sends the command 782 to the terminal apparatus 100 as the HTTP response to the command executed result 792 (the HTTP request) (S75).

All of the communication between the terminal apparatus 100 and the server apparatus 200 or the communication between the terminal apparatus 100 and the instruction apparatus 250 are conducted using the HTTP protocol which is started by the HTTP request from the terminal apparatus 100. Therefore, it is possible to carry out communication regardless of firewall, NAPT, Web proxy of the router apparatus 500, etc. which intervenes.

In the present embodiment, the server apparatus 200 is specialized in the operation of responding if there is an execution instruction to be executed by the terminal apparatus 100 or not. The instruction inquiries/instruction responses should be exchanged periodically even when there is no execution instruction to be executed by the terminal apparatus 100, so that the number is large, though the processing per time is light. In particular, when one server apparatus 200 manages a lot of terminal apparatuses 100, the number of instruction inquiries/instruction responses becomes huge.

However, the number of instruction inquiries/instruction responses per a time unit is a certain number which can be determined by a waiting time from receiving the instruction inquiry to sending the instruction response and the number of terminal apparatuses 100 managed by the server apparatus 200. Accordingly, processing capacity necessary to process the instruction inquiries/instruction responses is a certain steady loading.

Therefore, it is unnecessary to include reserve capacity in the processing capacity of the server apparatus 200, considering congestion of the traffic. This brings an effect that the operating cost of the remote operation system 600 can be reduced as a whole.

On the other hand, the instruction apparatus 250 is specialized in the operation of sending/receiving instruction sending requests/execution instructions/executed results. These communications are generated only when there is an execution instruction to be executed by the terminal apparatus 100, so that the number is small.

However, the processing per time is very heavy according to the load, etc. of command sending process, since transmission of the command, etc. is carried out from the application apparatus by actually connecting to the terminal apparatus through the instruction apparatus.

Further, it is unpredictable when it occurs, so that the processing capacity has to include reserve capacity, by considering congestion of the traffic.

By separating the server apparatus 200 and the instruction apparatus 250, not only an effect that the load can be distributed, but also another effect can be brought that even if the load of the instruction apparatus 250 becomes excessive because of congestion of the traffic, the server apparatus 200 is not influenced, so that the operation of the terminal apparatus 100, which has no execution instruction to execute, is not influenced.

Further, since the instruction response sent by the server apparatus 200 to the terminal apparatus 100 is a connection request including information showing the instruction apparatus 250 (IP address, etc.), so that if plural instruction apparatuses 250 are prepared, it is possible to direct a destination to be connected by the terminal apparatus 100 to the instruction apparatus 250 which has less load (in such a case, another process of re-direction, etc. is necessary at the application apparatus 300 side).

Because of this, it is possible to distribute the load and prevent concentration of the load on a specific instruction apparatus 250, so that the reserve capacity to be included in the processing capacity of the instruction apparatus 250 can be small.

Therefore, an effect can be brought that the operating cost of the remote operation system 600 can be reduced as a whole.

As discussed, by separating the server apparatus 200 processing the connection request and the instruction apparatus 250 performing actual data communication, it is sufficient to design the load of the server apparatus 200 according to the number of the terminal apparatuses 100 to be supported. Further, the instruction apparatus 250 can be designed according to the number of the terminal apparatuses 100 which operate simultaneously. In general, the number of apparatuses to be operated is quite few compared with the number of apparatuses to be supported, so that it is possible to construct the remote operation system 600 which can provide the same level of service with less processing capacity, which is a total of the processing capacity of the server apparatus 200 and the processing capacity of the instruction apparatus 250 according to the present embodiment, than the processing capacity of the server apparatus 200 according to the first embodiment.

In the process to prepare for establishing the communication session between the terminal apparatus 100 and the application apparatus 300, HTTP polling is carried out from the terminal apparatus 100 to the server apparatus 200.

In the process to maintain and manage the communication session between the terminal apparatus 100 and the application apparatus 300, sending/receiving of the HTTP request is carried out from the application apparatus 300 to the terminal apparatus through the server apparatus. At this time, the process to maintain/manage the session works as a kind of proxy.

As discussed, the process to prepare for establishing the session and the process to maintain/manage the session are processed at the rate of 1 to N, which enables the processing with less resource even when a lot of communication sessions are maintained/managed.

The terminal apparatus, the server apparatus, the instruction apparatus, and the remote operation system that have been discussed above include the following characteristics.

The terminal apparatus is characterized to comprise:
(a) the server accessing unit conducting an HTTP or HTTPS access by adding at least 0 piece of data obtained from the terminal controlling unit, receiving its reply, and giving the data to the reply analyzing unit;
(b) the reply analyzing unit analyzing the data of reply given by the server accessing unit, if the data contents is a command, giving the data to the command executing unit, and if no command exists, giving a control to the terminal controlling unit without processing the data;
(c) the command executing unit executing the command received from the reply data analyzing unit, and giving an executed result of the command to the terminal controlling unit; and
(d) the terminal controlling unit repeatedly performing the following: if the command executed result data is received from the command executing unit, giving the data as additional data to the server accessing unit, and if the control is received from the reply data analyzing unit, giving the control to the server accessing unit without giving the additional data.

The server apparatus is characterized to comprise:
(a) the terminal access receiving unit receiving the HTTP or HTTPS access, to which at least 0 piece of data is added, from the terminal apparatus, giving the access to the access data analyzing unit, and returning the data received from the server controlling unit as its reply;
(b) the application access receiving unit receiving an access, to which command data for operating the terminal apparatus is added, from another application system, giving received information to the access data analyzing unit, and returning data received from the server controlling unit as the reply to the application system;
(c) the access data analyzing unit, if the access is received from the application receiving unit within a predetermined time after the access is received from the terminal access receiving unit, giving information obtained by the access to the server controlling unit, and if no access is received from the application receiving unit within the predetermined time, giving a control to the server controlling unit without processing; and
(d) the server controlling unit repeating the following: receiving at least 0 piece of command data from the access data analyzing unit, giving the data to the terminal access receiving unit, and returning a command executed result obtained from the access data analyzing unit to the application system.

A session management apparatus (a remote operation system) is characterized to comprise the above terminal apparatus and the above server apparatus.

The terminal apparatus is characterized to comprise:
(a) the server pre-accessing unit conducting an HTTP or HTTPS access to the server according to the instruction by the terminal controlling unit, receiving its reply, and giving the data to reply data analyzing means;
(b) the request data analyzing unit analyzing reply data given by the server pre-accessing unit, if the data contents is a connection request, notifying the server communicating unit, and if not the connection request, notifying the terminal controlling unit of the fact;
(c) the server communicating unit receiving the notification from the request data analyzing unit, accessing the server, receiving a command, giving the received command to the command executing unit, and giving an executed result of the command to the server by accessing;
(d) the command executing unit executing the command received from the server communicating unit, and giving the command executed result to the server communicating unit; and (e) the terminal controlling unit obtaining information that no connection request exists from the request data analyzing unit, and repeatedly performing the implementation of the server pre-accessing unit.

The server apparatus is characterized to comprise:
(a) the terminal pre-accessing unit receiving the HTTP or HTTPS access from the terminal apparatus, if the connection request from the server controlling unit exists, mounting data of the connection request as a reply, and if not included, mounting no data to return as a reply;
(b) the application access receiving unit receiving an access, to which command data for operating the terminal apparatus is added, from another application system, giving the access to the server controlling unit as connection information, giving the received information to the terminal communicating unit, and returning data received from the terminal communicating unit to the application system as the reply;
(c) the terminal communicating unit receiving an access from the terminal, if the access includes data, giving the data to the application access receiving unit, and giving data received from the application access receiving unit as its reply; and
(d) the server controlling unit receiving the connection request from the application access receiving unit and giving the request to the terminal pre-accessing unit.

A session management apparatus (the remote operation system) is characterized to include the above terminal apparatus and the above server apparatus.

The server apparatus is characterized to comprise:
(a) the terminal pre-accessing unit receiving an HTTP or HTTPS access from the terminal apparatus, if a connection request from the server controlling unit exists, mounting data of the connection request as its reply, and if not included, mounting no data to return as the reply; and
(b) the application access receiving unit receiving an access, to which command data for operating the terminal apparatus is added, from another application system, giving the access to the server controlling unit as connection information, giving the received information to the terminal communicating unit, and returning data received from the terminal communicating unit to the application system as the above reply.

A server apparatus (the instruction apparatus), which is different from the above server apparatus, is characterized to comprise:
(c) the terminal communicating unit receiving an access from the terminal, if the access includes data, giving the data to the application access receiving unit, and giving data received from the application access receiving unit as its reply; and
(d) the server controlling unit receiving a connection request from the application access receiving unit and giving the request to the terminal pre-accessing unit.

The session management apparatus (the remote operation system) is characterized to include the above terminal apparatus, the above server apparatus, and the above server apparatus (the instruction apparatus), which is different from the server apparatus.

The terminal apparatus is characterized to conduct connection again by the server accessing unit if connection between the terminal apparatus and the server apparatus is disconnected because of network failure, etc.

This enables instant access from the server apparatus at the Internet side to the terminal apparatus at the LAN side, with maintaining the prescribed security without changing setting of the router, etc. in an environment in which Web access is possible.

Here, the execution device does not need to be included in the terminal apparatus, but can be connected from the terminal apparatus via LAN or a unique network, etc.

For example, in a cooling/heating equipment system, a cooling/heating equipment as the execution device (for example, an internal device or an external device of an air conditioner) and a cooling/heating equipment controller (a terminal controlling device), which generally manages/controls them, sometimes exist as separate devices.

In such a case, the cooling/heating equipment controller (the terminal controlling device) is connected to each cooling/heating equipment (the execution device) via a unique network, and the cooling/heating equipment controller (the terminal controlling device) is connected to the server apparatus on the Internet through the router apparatus via LAN, etc.

In the above example, the whole cooling/heating equipment system including the cooling/heating equipment (the execution device) and the cooling/heating equipment controller (the terminal controlling device) corresponds to "the terminal apparatus" in this specification.

Further, the terminal apparatus can be in a form in which plural execution devices are connected to one terminal controlling device, which does not include the execution device.

Similarly, in a water heater system, a floor heating system, a lighting system, an elevator system, a total electric system, a security system, a monitoring camera system, and an FA system, etc., if similar relationship exists between each equipment (the execution device) and each controller (the terminal controlling device), the whole system corresponds to "the terminal apparatus" in this specification.

BRIEF EXPLANATION OF THE DRAWINGS

FIG. 13 is a system configuration showing an example of general configuration of the remote operation system 600 according to the third embodiment.

FIG. 14 is a block diagram showing an example of functional block configuration of the terminal apparatus 100, the server apparatus 200, an instruction apparatus 250, and the application apparatus 300 according to the third embodiment.

FIG. 15 is a sequence diagram showing an example of messages exchanged among the terminal apparatus 100, the server apparatus 200, the instruction apparatus 250, and the application apparatus 300 according to the third embodiment.

EXPLANATION OF SIGNS

Figure 1:
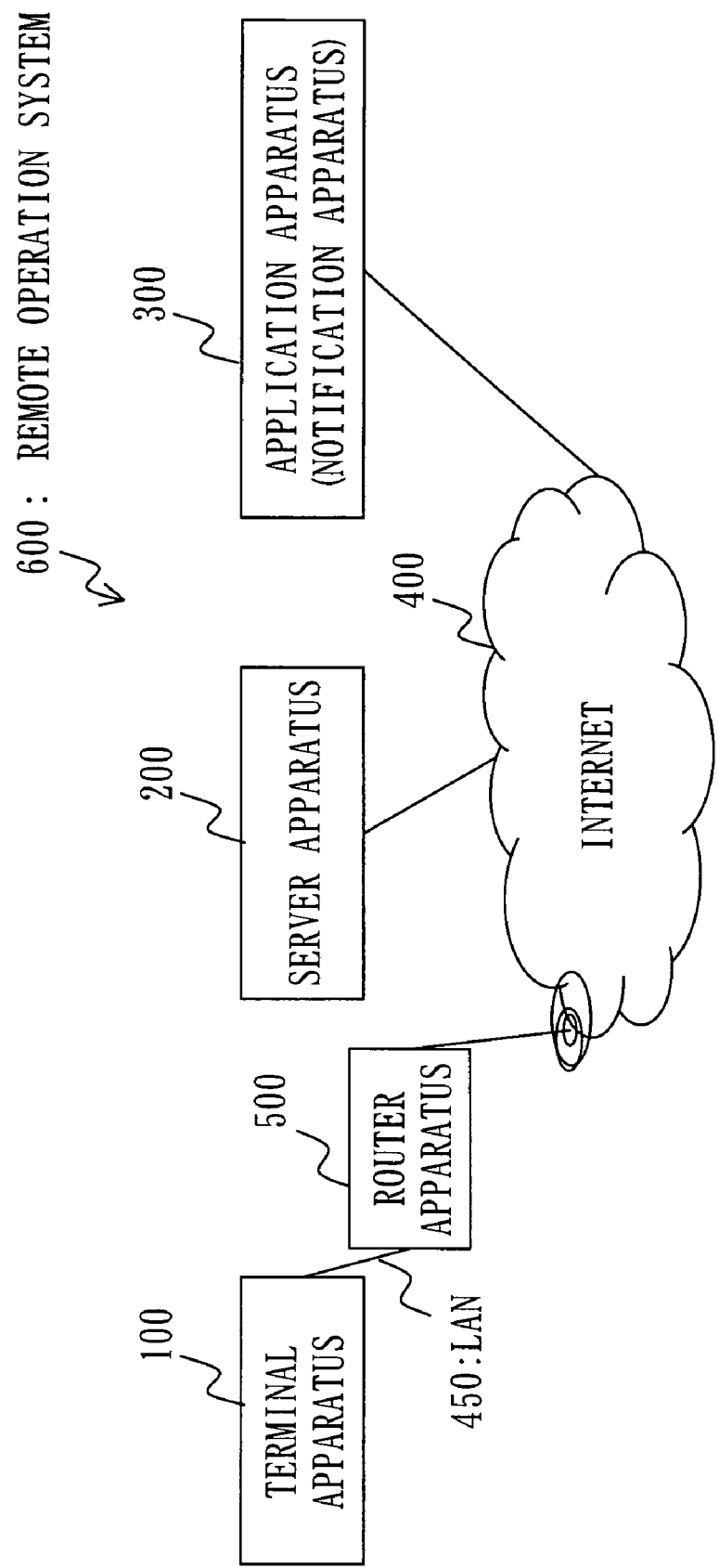
FIG. 1 is a system configuration showing an example of general configuration of a remote operation system 600 according to the first embodiment.
Figure 2:
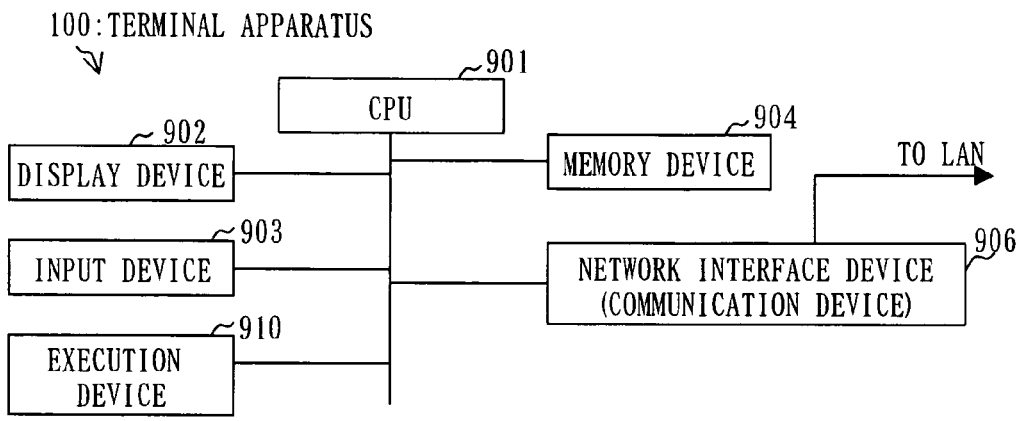
FIG. 2 is a hardware configuration showing an example of hardware configuration of a terminal apparatus 100 according to the first embodiment.
Figure 3:
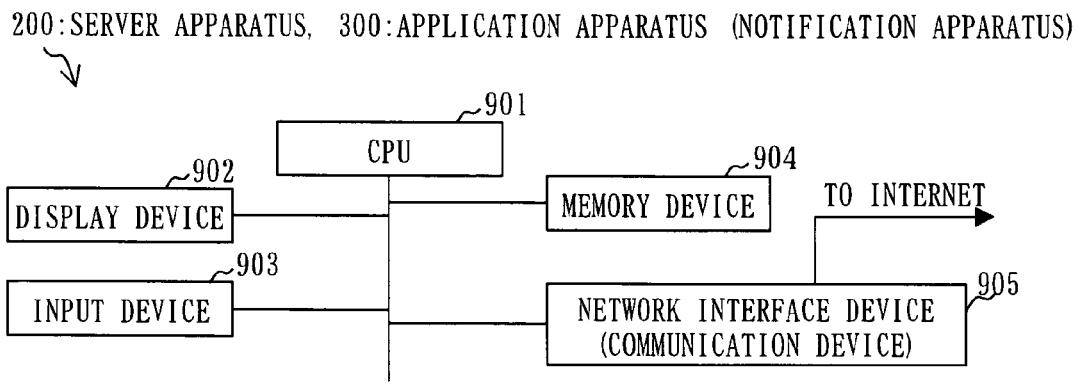
FIG. 3 is a hardware configuration showing an example of hardware configuration of a server apparatus 200 and an application apparatus 300 according to the first embodiment.
Figure 4:
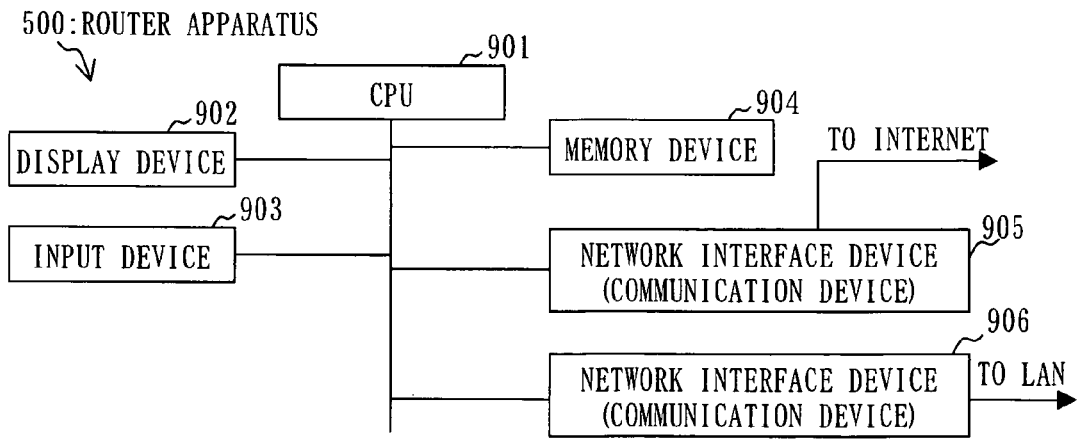
FIG. 4 is a hardware configuration showing an example of hardware configuration of a router apparatus 500 according to the first embodiment.
Figure 5:
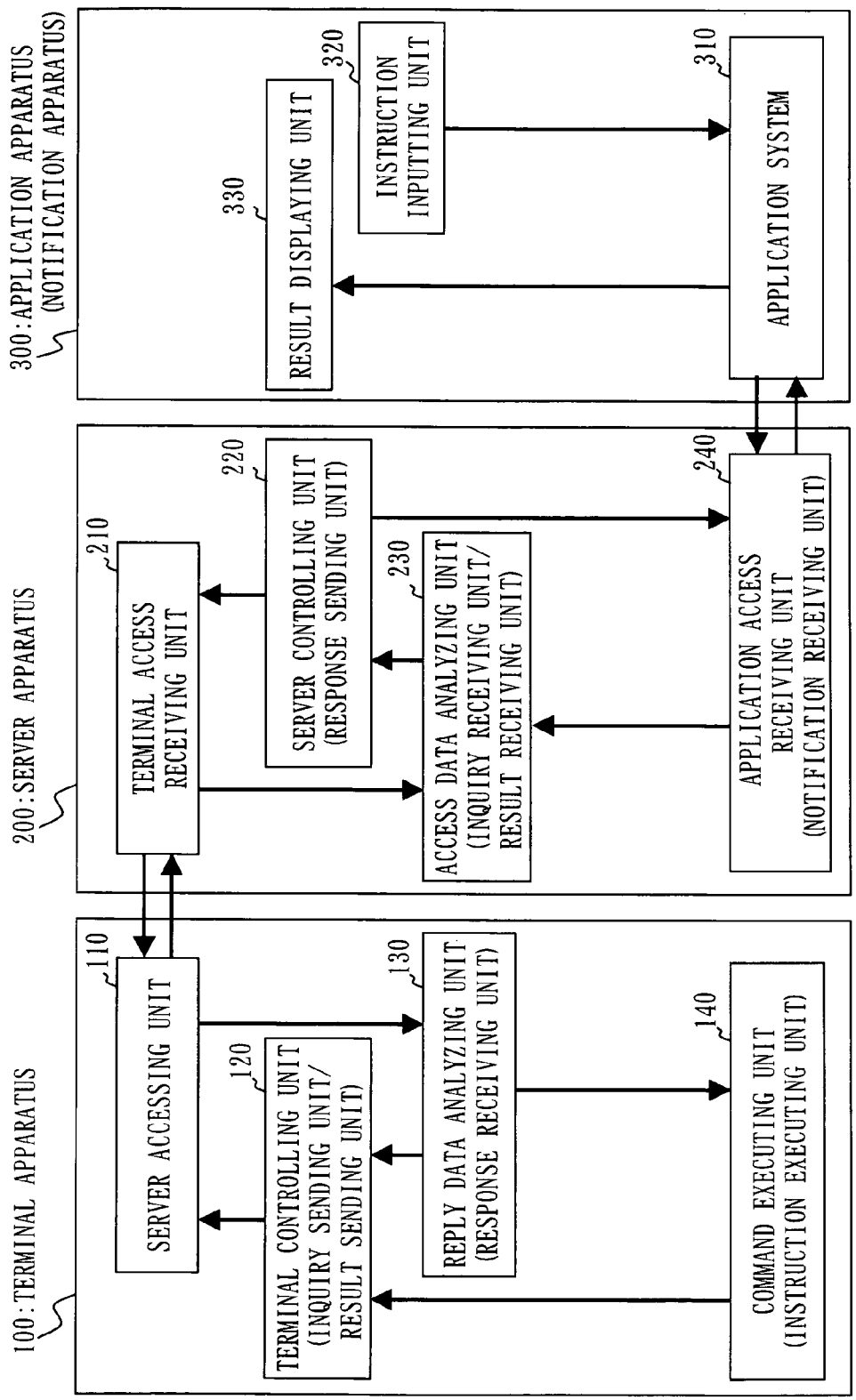
FIG. 5 is a block diagram according an example of functional block of the terminal apparatus 100, the server apparatus 200, and the application apparatus 300 according to the first embodiment.
Figure 6:
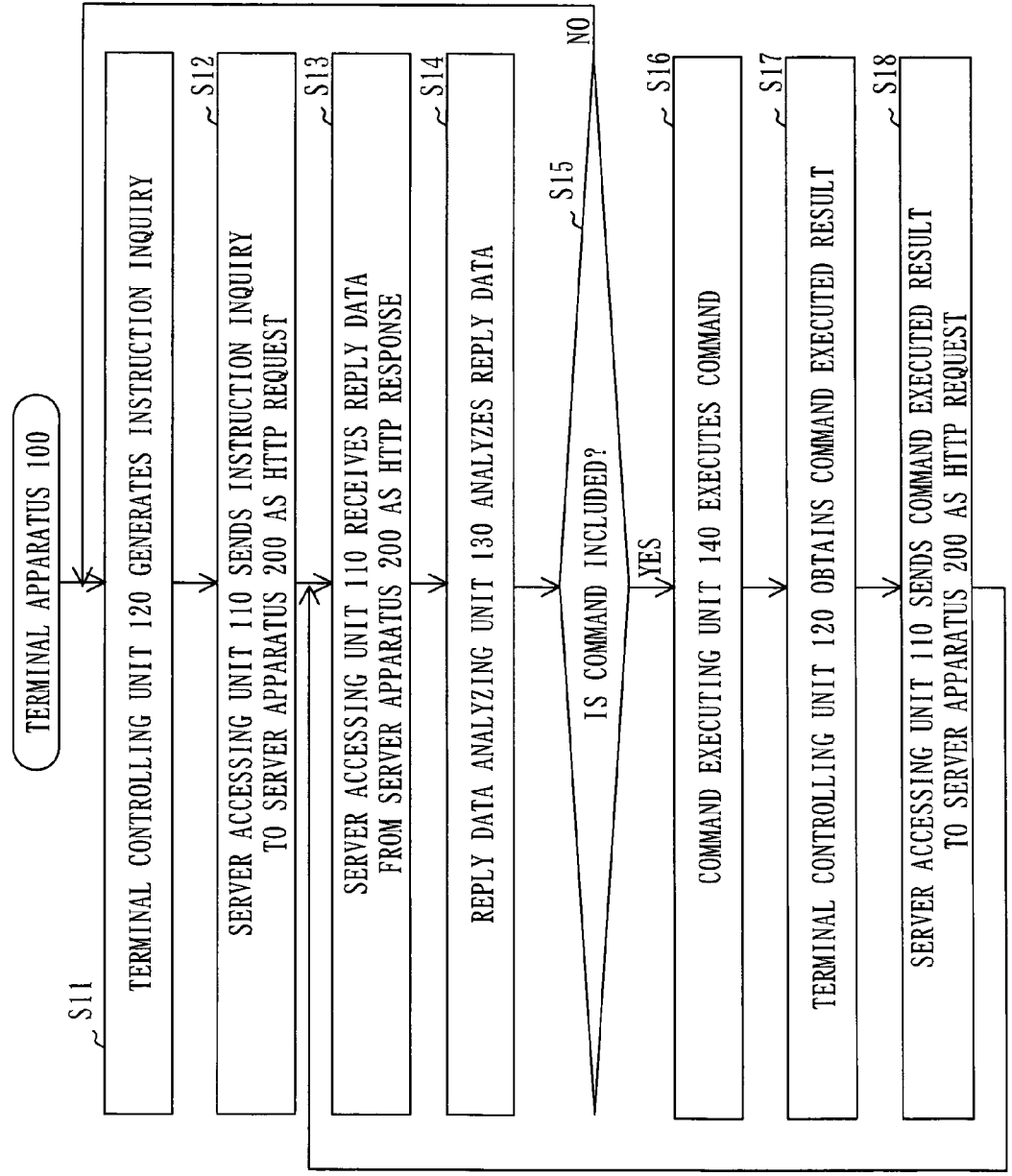
FIG. 6 is a flowchart showing an example of processing of the terminal apparatus 100 according to the first embodiment.
Figure 7:
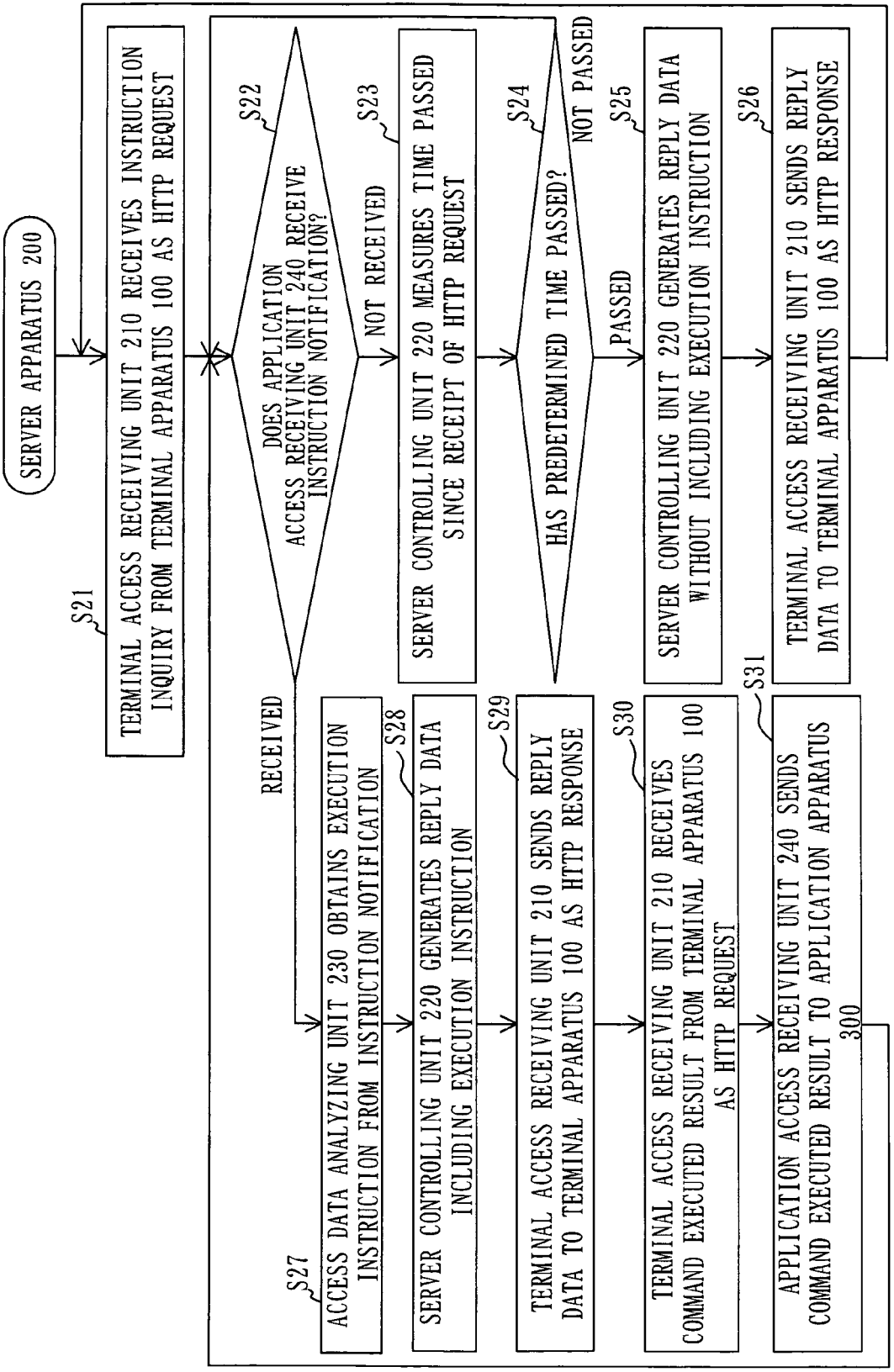
FIG. 7 is a flowchart showing an example of processing of the server apparatus 200 according to the first embodiment.
Figure 8:
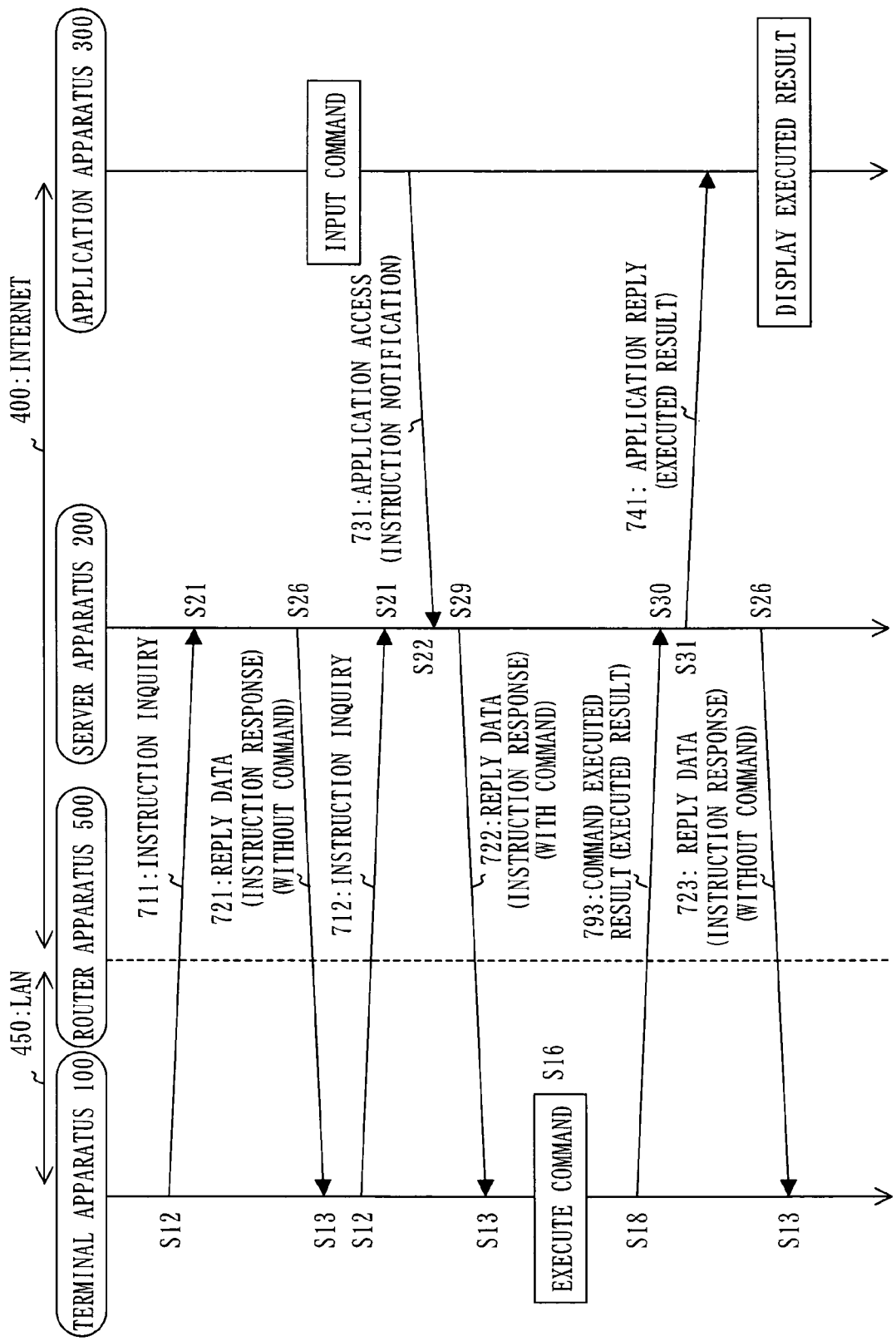
FIG. 8 is a sequence diagram showing an example of messages exchanged among the terminal apparatus 100, the server apparatus 200, and the application apparatus 300 according to the first embodiment.
Figure 9:
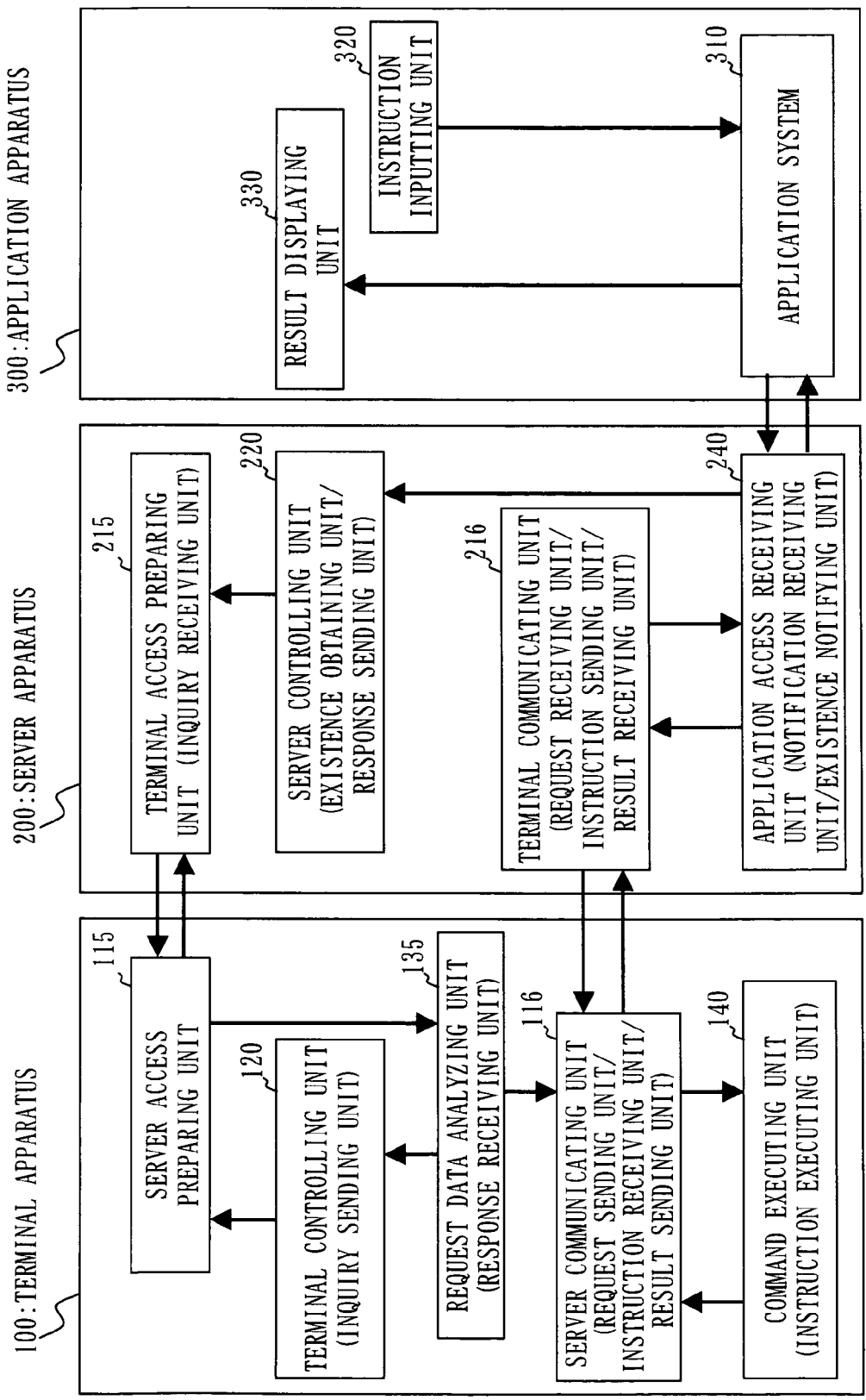
FIG. 9 is a block diagram showing an example of functional block configuration of the terminal apparatus 100, the server apparatus 200, and the application apparatus 300 according to the second embodiment.
Figure 10:
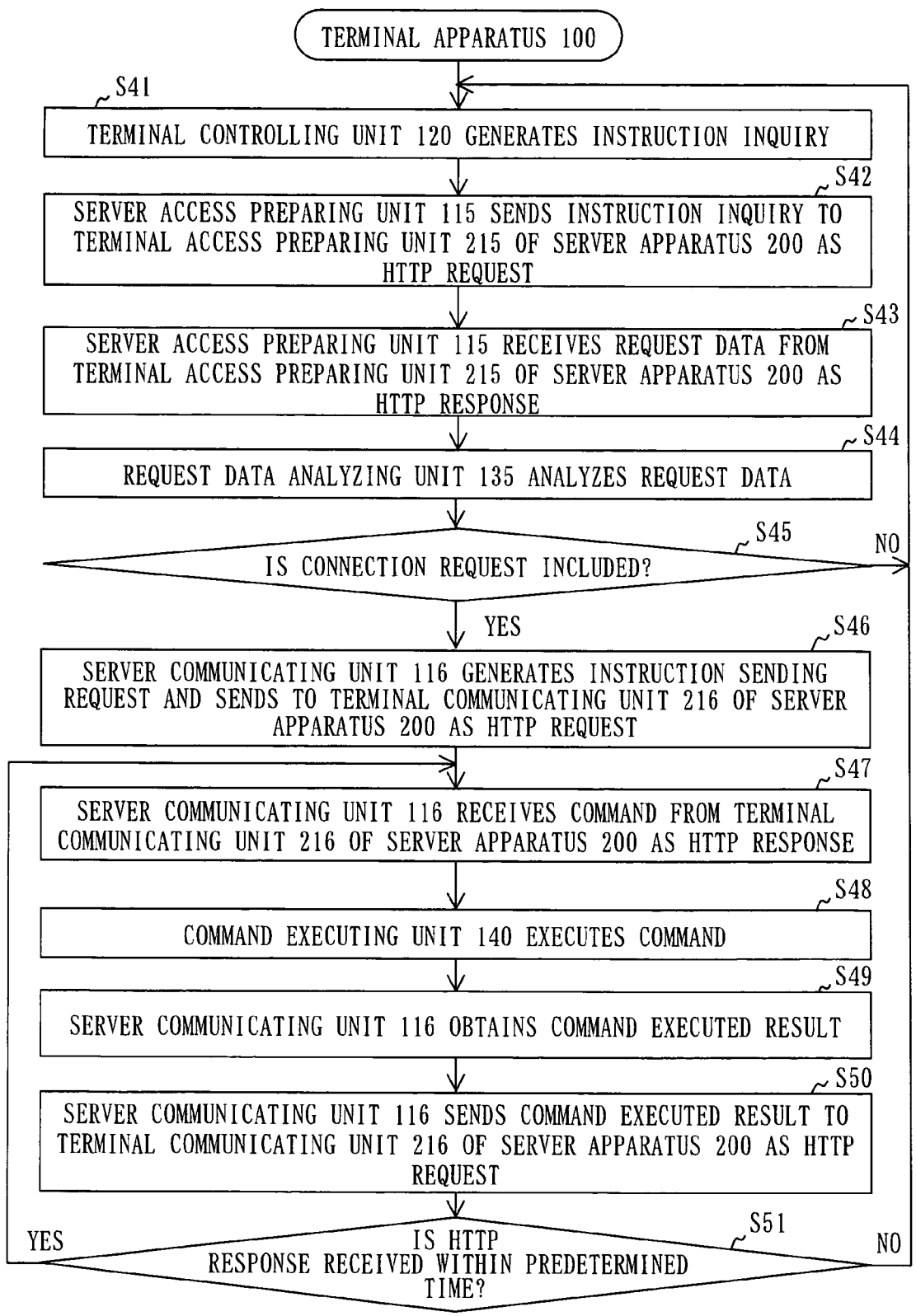
FIG. 10 is a flowchart showing an example of processing of the terminal apparatus 100 according to the second embodiment.
Figure 11:
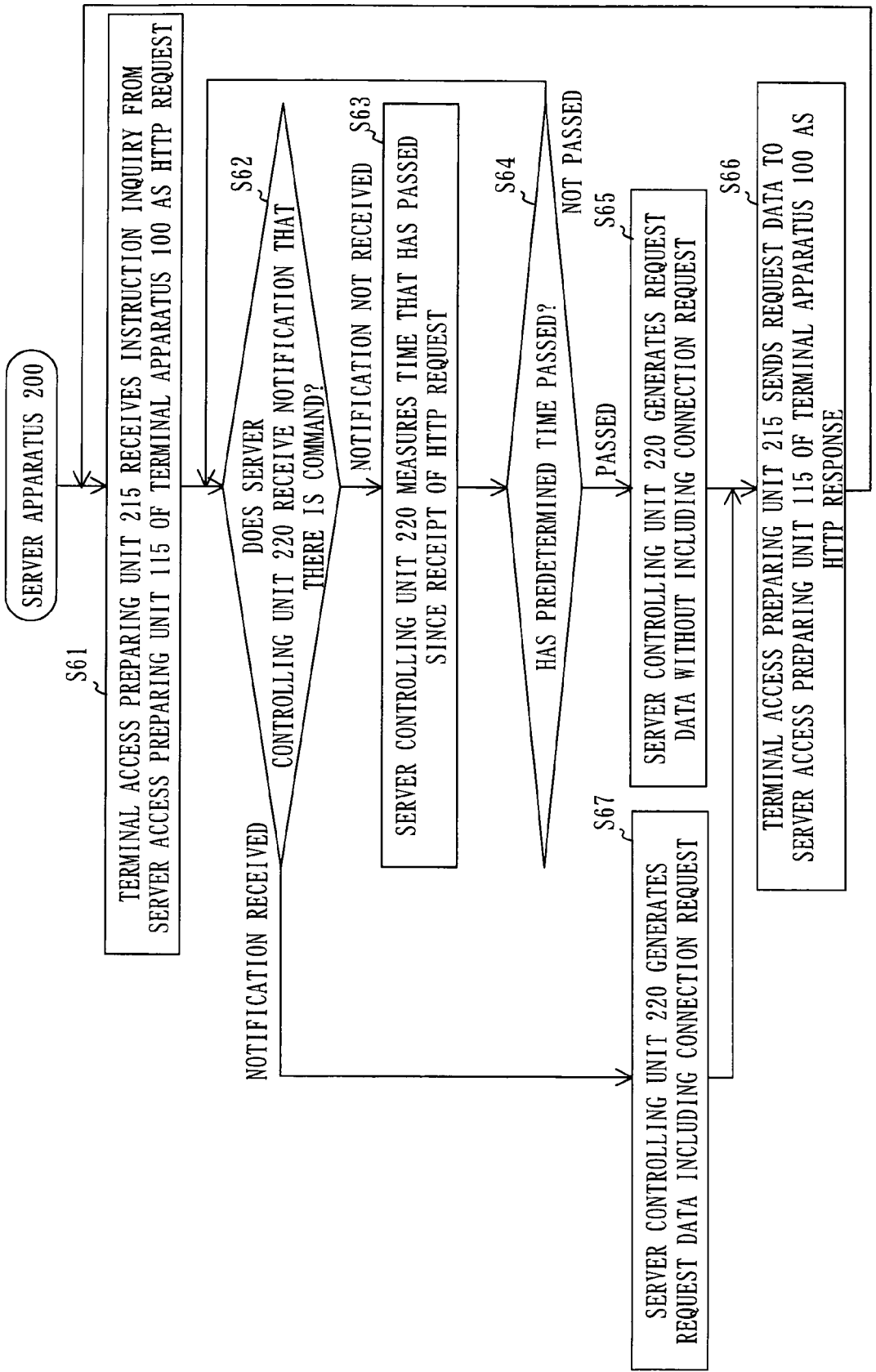
FIG. 11 is a flowchart showing an example of processing of the server apparatus 200 (a terminal access preparing unit 215, a server controlling unit 220) according to the second embodiment.
Figure 12:
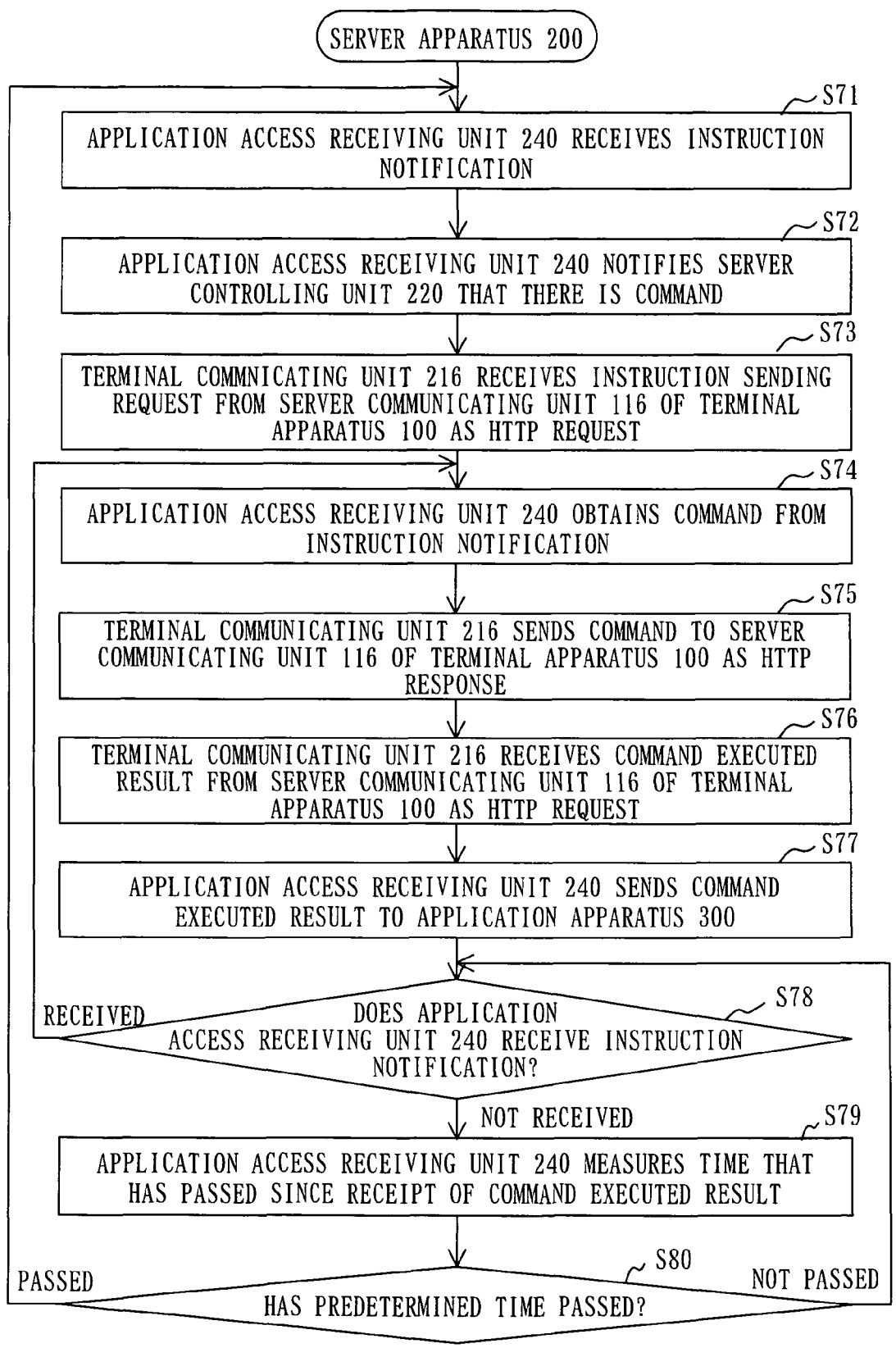
FIG. 12 is a flowchart showing an example of processing of the server apparatus 200 (a terminal communicating unit 216, an application access receiving unit 240) according to the second embodiment.

100: a terminal apparatus; 110: a server accessing unit; 115: a server access preparing unit; 116: a server communicating unit; 120: a terminal controlling unit; 130: a reply data analyzing unit; 140: a command executing unit; 200: a server apparatus; 210: a terminal access receiving unit; 230: an access data analyzing unit; 240: an application access receiving unit; 300: an application apparatus; 310: an application system; 320: an instruction inputting unit; 330: a result displaying unit; 400: the Internet; 500: a router apparatus; 711-712: instruction inquiries; 721-723: reply data; 731-732: application accesses; 741: an application reply; 751: request data; 761: an instruction sending request; 771: an existence notification; 781-782: commands; 792-793: command executed results; 901: a CPU; 902: a display device; 903: an input device; 904: a memory device; 905, 906: network interface devices; and 910: an execution device.

The invention claimed is:

1. A terminal apparatus having a communication device communicating with a server apparatus via a network and an execution device executing an execution instruction, the terminal apparatus comprising:
a computer processor programmed to implement:
an inquiry sending unit for sending an instruction inquiry to inquire about existence/absence of the execution instruction, in a form of an HTTP (Hypertext Transfer Protocol) request, to the server apparatus using the communication device;
a response receiving unit for receiving a response to the instruction inquiry sent by the inquiry sending unit as an instruction response, in a form of an HTTP response to the HTTP request which is the instruction inquiry, from the server apparatus using the communication device;
an instruction executing unit for executing the execution instruction using the execution device when the instruction response received by the response receiving unit has contents showing that the execution instruction exists; and
a result sending unit for sending a result of the execution instruction executed by the instruction executing unit as an executed result, in the form of the HTTP request, to the server apparatus using the communication device,
wherein the response receiving unit further receives existence/absence of another execution instruction to be executed by the execution device as the instruction response, in the form of the HTTP response to the HTTP request which is the executed result sent by the result sending unit, from the server apparatus using the communication device.

2. The terminal apparatus of claim 1,
wherein the instruction executing unit, when the execution instruction is included in the instruction response received by the response receiving unit, executes the execution instruction included in the instruction response using the execution device.

3. The terminal apparatus of claim 1,
wherein the communication device further communicates with an instruction apparatus via the network,
wherein the computer processor further implements:
a request sending unit for sending an instruction sending request to request transmission of the execution instruction, in the form of the HTTP request, to the instruction apparatus using the communication device when the instruction response received by the response receiving unit has contents showing that the execution instruction exists; and
an instruction receiving unit for receiving the execution instruction as a response to the instruction sending request sent by the request sending unit, in the form of the HTTP response to the HTTP request which is the instruction sending request, from the instruction apparatus using the communication device,
wherein the instruction executing unit executes the execution instruction received by the instruction receiving unit using the execution device.

4. The terminal apparatus of claim 3, the computer processor further implementing:
a result sending unit for sending a result of the execution instruction executed by the instruction executing unit as an executed result, in the form of the HTTP request, to the instruction apparatus using the communication device,
wherein the instruction receiving unit further receives another execution instruction to be executed by the execution device, in the form of the HTTP response to the HTTP request which is the executed result sent by the result sending unit, from the instruction apparatus using the communication device.

5. The terminal apparatus of claim 1,
wherein the inquiry sending unit, when the instruction response received by the response receiving unit has contents showing no execution instruction exists, further sends the instruction inquiry to the server apparatus using the communication device.

6. The terminal apparatus of claim 1, wherein
the terminal apparatus communicates with an instruction apparatus via the internet, the instruction apparatus being communicatively connected to the server apparatus via the internet, and
the terminal apparatus initiates communication with the instruction apparatus by sending an HTTP request to the server apparatus.

7. A server apparatus having a communication device communicating with a terminal apparatus via a network, the server apparatus comprising:
a computer processor programmed to implement:
an inquiry receiving unit for receiving an instruction inquiry to inquire about existence/absence of an execution instruction to be executed by the terminal apparatus, in a form of an HTTP request, from the terminal apparatus using the communication device;

a response sending unit for sending a response to the instruction inquiry received by the inquiry receiving unit as an instruction response, in a form of an HTTP response to the HTTP request which is the instruction inquiry, to the terminal apparatus using the communication device; and a result receiving unit for receiving a result of the execution instruction executed by the terminal apparatus as an executed result, in the form of the HTTP request, from the terminal apparatus using the communication device, wherein the response sending unit further sends existence/absence of another execution instruction to be executed by the terminal apparatus as the instruction response, in the form of HTTP response to the HTTP request which is the executed result, to the terminal apparatus using the communication device.

8. The server apparatus of claim 7, wherein the response sending unit, when the execution instruction to be executed by the terminal apparatus exists, sends the instruction response including the execution instruction to the terminal apparatus using the communication device.

9. The server apparatus of claim 7, the computer processor further implementing:

a notification receiving unit for receiving the execution instruction from a notification apparatus notifying of the execution instruction to be executed by the terminal apparatus, wherein the response sending unit, when the notification receiving unit receives the execution instruction from the notification apparatus sends the instruction response having contents showing that the execution instruction exists to the terminal apparatus using the communication device, and when the notification receiving unit does not receive the execution instruction from the notification apparatus while waiting for a predetermined time, sends the instruction response having contents showing that no execution instruction exists to the terminal apparatus using the communication device.

10. The server apparatus of claim 9, wherein the communication device communicates with the terminal apparatus and the instruction apparatus, respectively, via the internet.

11. The server apparatus of claim 7, the computer processor further implementing:

an existence obtaining unit for obtaining a notification that the execution instruction exists from an instruction apparatus notifying of existence of the execution instruction to be executed by the terminal apparatus, wherein the response sending unit, when the existence obtaining unit obtains the notification that the execution instruction exists from the instruction apparatus sends the instruction response having contents showing that the execution instruction exists, to the terminal apparatus using the communication device, and when the existence obtaining unit does not receive the notification that the execution instruction exists from the instruction apparatus while waiting for a predetermined time, sends the instruction response having contents showing that no execution instruction exists, to the terminal apparatus using the communication device.

12. An instruction apparatus having a communication device communicating with a terminal apparatus via a network, the instruction apparatus comprising:

a computer processor programmed to implement:

a request receiving unit for receiving an instruction sending request to request transmission of an execution instruction to be executed by the terminal apparatus, in a form of an HTTP request, from the terminal apparatus using the communication device;

an instruction sending unit for sending the execution instruction as a response to the instruction sending request received by the request receiving unit, in a form of an HTTP response to the HTTP request which is the instruction sending request, to the terminal apparatus using the communication device; and a result receiving unit for receiving a result of the execution instruction executed by the terminal apparatus as an executed result in the form of the HTTP request from the terminal apparatus using the communication device, wherein the instruction sending unit further sends another execution instruction to be executed by the terminal apparatus, in the form of the HTTP response to the HTTP request which is the executed result, to the terminal apparatus using the communication device.

13. The instruction apparatus of claim 12, the computer processor further implementing:

a notification receiving unit for receiving the execution instruction from a notification apparatus notifying of the execution instruction to be executed by the terminal apparatus; and an existence notifying unit for notifying a server apparatus, which informs the terminal apparatus of existence/absence of the execution instruction, that the execution instruction exists when the notification receiving unit receives the execution instruction.

14. The instruction apparatus of claim 12, wherein the instruction apparatus communicates with the terminal apparatus by conducting communications with the server apparatus via the internet, during which the instruction apparatus prompts the server apparatus to send the HTTP response to the terminal apparatus.

* * * * *